US012691406B2

(12) United States Patent
Perkin

(10) Patent No.: US 12,691,406 B2
(45) Date of Patent: Jul. 28, 2026

(54) ATMOSPHERIC WATER HARVESTING DEVICE AND METHOD

(71) Applicant: Ahbstra Engineering Ltd, London (GB)

(72) Inventor: Richard Perkin, Devon (GB)

(73) Assignee: Ahbstra Engineering Ltd (GB)

( * ) Notice: Subject to any disclaimer, the term of this patent is extended or adjusted under 35 U.S.C. 154(b) by 320 days.

(21) Appl. No.: 18/692,601

(22) PCT Filed: Sep. 15, 2022

(86) PCT No.: PCT/GB2022/052343
§ 371 (c)(1),
(2) Date: Mar. 15, 2024

(87) PCT Pub. No.: WO2023/041918
PCT Pub. Date: Mar. 23, 2023

(65) Prior Publication Data
US 2024/0424441 A1     Dec. 26, 2024

(30) Foreign Application Priority Data

Sep. 15, 2021     (GB) ..................................... 2113190

(51) Int. Cl.
 B01D 53/26 (2006.01)
 B01D 15/18 (2006.01)
(52) U.S. Cl.
 CPC ......... B01D 53/261 (2013.01); B01D 53/265 (2013.01); B01D 15/1894 (2025.01); B01D 2257/80 (2013.01); B01D 2259/40086 (2013.01)

(58) Field of Classification Search
 CPC ................ B01D 53/261; B01D 53/265; B01D 15/1894; B01D 2257/80;
 (Continued)

(56) References Cited

U.S. PATENT DOCUMENTS 5,338,450 A * 8/1994 Maurer .................. B01J 8/0235
 210/493.4
5,632,802 A  5/1997 Grgich
 (Continued)

FOREIGN PATENT DOCUMENTS

CA      3167734 A1     8/2021
CN      201361513      12/2009
 (Continued)

OTHER PUBLICATIONS

Wang J.Y. et al, "A high efficient semi-open system for fresh water production from atmosphere" Energy vol. 138 Nov. 1, 2017.
 (Continued)

*Primary Examiner* — Dung H Bui
(74) *Attorney, Agent, or Firm* — Fishman Stewart PLLC

(57) ABSTRACT
A water harvesting unit may include a cylindrical vessel having a central axis. The vessel may include an at least partially fluid-permeable first cylindrical sidewall, an at least partially fluid-permeable second cylindrical sidewall, a fluid impermeable annular base, and a fluid impermeable annular lip. The first cylindrical sidewall may define a vessel inlet. The second cylindrical sidewall may define a vessel outlet. The first cylindrical sidewall and the second cylindrical sidewall may extend between the annular base and the annual lip. The second cylindrical sidewall may be disposed at least partially within the first cylindrical sidewall.

12 Claims, 14 Drawing Sheets

(58) Field of Classification Search
CPC ........ B01D 2259/40086; B01D 53/002; B01D
5/0006; B01D 53/08; B01D 53/28; B01D
2258/06; Y02A 20/00
See application file for complete search history.

(56) References Cited

U.S. PATENT DOCUMENTS

| | | | |
|---|---|---|---|
| 5,807,422 A * | 9/1998 | Grgich | B01D 53/0454 |
| | | | 96/111 |
| 5,916,531 A * | 6/1999 | Pan | B01D 53/0446 |
| | | | 422/177 |
| 6,719,599 B2 | 4/2004 | Mccarthy | |
| 8,182,674 B2 * | 5/2012 | Prigent | B04C 1/00 |
| | | | 415/121.2 |
| 9,446,343 B2 | 9/2016 | Elliott | |
| 10,653,993 B2 * | 5/2020 | Dinca | B01J 20/3425 |
| 11,266,943 B1 * | 3/2022 | Stark, Jr. | B01D 53/0446 |
| 11,647,761 B2 | 5/2023 | Tagawa | |
| 12,458,911 B2 * | 11/2025 | van der Meijden | C02F 1/001 |
| 2018/0161701 A1 * | 6/2018 | Crasti | B01D 15/18 |

| | | | |
|---|---|---|---|
| 2018/0171604 A1 | 6/2018 | Kim | |
| 2020/0282379 A1 | 9/2020 | Mulet | |
| 2023/0338891 A1 | 10/2023 | Smith | |

FOREIGN PATENT DOCUMENTS

| | | |
|---|---|---|
| CN | 110958908 A | 4/2020 |
| WO | 2016187709 | 12/2016 |
| WO | 2019144150 A1 | 7/2019 |
| WO | 2019152962 A2 | 8/2019 |
| WO | 2019220225 A1 | 11/2019 |
| WO | 2020036905 A1 | 2/2020 |
| WO | 2020154427 A1 | 7/2020 |
| WO | 2021102385 A1 | 5/2021 |
| WO | 2021181097 | 9/2021 |

OTHER PUBLICATIONS

Li Renyuan et al. "Improving atmospheric water production yield:
Enabling multiple water harvesting cycles with Nano sorbent" Nano
Energy, vol. 67, Jan. 1, 2020.
GB search report for GB2113190.9, dated Mar. 8, 2022.

* cited by examiner

ATMOSPHERIC WATER HARVESTING DEVICE AND METHOD

CROSS-REFERENCE TO RELATED APPLICATIONS

This application claims priority to International Patent Application No. PCT/GB2022/052343, filed on Sep. 15, 2022, and British Patent Application No. GB 2113190.9, filed on Sep. 15, 2021, the contents of both of which are hereby incorporated by reference in their entirety.

TECHNICAL FIELD

The present disclosure relates to an atmospheric water harvesting device and method. Specifically, the present disclosure relates to a device and method for atmospheric water harvesting using a desiccant material.

BACKGROUND

The demand for potable water in arid regions is hard to satisfy due to the lack of natural water reservoirs such as those found in more temperate regions. Mechanical systems which harvest water from the atmosphere are known. Such systems typically use a mechanically-cooled surface to condense water vapour from the air. However, such mechanical systems are energy intensive and inefficient.

Dehumidification systems which use adsorbent materials such as silica are also known. In such systems, atmospheric water is harvested by using a desiccant to adsorb water from the atmosphere before desorption/regeneration of the desiccant by heating. The desorption/regeneration of the desiccant by heating is an energy intensive process dictated predominantly by the latent heat of vaporisation of water. These systems are therefore not necessarily any more energy efficient than mechanical atmospheric water harvesting systems.

New types of atmospheric harvesting system are beginning to emerge that use Metal Organic Framework (MOF) materials as the desiccant. MOF materials are able to adsorb water molecules at very low levels of relative humidity in the air, and are also able to release the bound water molecules at temperatures significantly lower than those required for other desiccant materials, such as silica, that have traditionally been used in dehumidification equipment. Some MOF materials can be desorbed/regenerated using heat sources that would typically be considered as "low grade heat" such as waste heat from manufacturing processes and power generation, geothermal heat, solar heat or any combination of renewable or non-renewable heat sources. Example MOF atmospheric water harvesting systems are disclosed in US 2018/171604 and WO 2019/152962.

The system described hereinbelow provides improvements over known atmospheric water harvesting systems.

SUMMARY

The present invention provides a water harvesting unit comprising a cylindrical vessel having a central axis, wherein the vessel comprises: an at least partially fluid-permeable first cylindrical sidewall defining a vessel inlet; an at least partially fluid-permeable second cylindrical sidewall defining a vessel outlet; a fluid impermeable annular base; and a fluid impermeable annular lip, wherein the first and second cylindrical side walls extend between the annular base and the annual lip, and wherein the second cylindrical side wall is located at least partially within the first cylindrical sidewall.

Optionally the first cylindrical sidewall diverges away from the base such that the vessel is substantially frusto-conical.

The lip is optionally angled with respect to the base.

The base may comprise a first locating formation located on an external surface of the base, and wherein the lip comprises a second locating formation located on the external surface of the lip, wherein the first locating formation is configured to inter-engage with the second locating formation of an adjacent water harvesting unit.

In one example, the water harvesting unit contains a charge of desiccant material.

In another aspect, the present invention provides a stack of water harvesting units which may be a stack of individual units, or which may be formed as an integral unit.

In a further aspect, the present invention provides, a water harvesting apparatus comprising one or more harvesting units described above, or a stack of water harvesting units described above, located in an outer housing and arranged for rotation within the housing, wherein the one or more water harvesting units are configured to be rotated with respect to the housing about a common central axis.

Optionally each water harvesting unit is orientated such that the central axis is vertical.

The outer housing optionally comprises an air inlet channel and an air outlet, wherein the air inlet channel is in fluid communication with the vessel inlet of each water harvesting unit, and wherein the air outlet is in fluid communication with the vessel outlet of each water harvesting unit.

The air inlet channel may have a volute configuration.

In one example, the outer housing may have a volute configuration.

Optionally the inlet channel is configured to receive airflow at its widest end in use.

The present invention also provides a water harvesting unit. The water harvesting unit comprises an inlet portion comprising a vessel having a substantially circular fluid impermeable base and an opening located opposite the base. The base is surrounded by an at least partially fluid permeable sidewall which extends away from the base towards the opening. The water harvesting unit further comprises an outlet portion, the outlet portion comprising an annular outlet which extends beyond the sidewall in a direction away from the base of the vessel. The water harvesting unit provides a convenient means for retaining a charge of particulate desiccant material while allowing it to be fluidised by an incoming airflow so to effect adsorption or desorption of water to or from the desiccant material.

The sidewall may diverge away from the base such that the vessel is substantially frustoconical. The divergence of the sidewall means that, when the water harvesting unit is rotating in use, the depth of an annular charge of particulate desiccant material is substantially consistent across its height, ensuring that the pressure drop across the annular charge is uniform.

The vessel may comprise a lip surrounding the vessel opening, wherein the lip extends between the vessel opening and the sidewall. The lip may be frustoconical such that the lip extends from the sidewall towards the opening in a direction away from the base. The presence of the lip, especially when frustoconical in shape, helps to prevent elutriation of the particulate desiccant material, in use.

The outlet portion may comprise a cover plate located opposite to, and spaced from, the vessel opening. The annular outlet may be located between the sidewall and the cover plate.

The outlet portion may further comprise a plurality of guide vanes located adjacent to the vessel opening, wherein the guide vanes provide fluid communication between the vessel opening and the annular outlet. The guide vanes may extend between the vessel opening and the cover plate.

The cover plate may comprise the base of an adjacent water harvesting unit as described above. A plurality of such water harvesting arrangements may form a stack.

In another aspect, the invention provides a water harvesting apparatus comprising such a stack of water harvesting units located in an outer housing and arranged on a drive shaft. The water harvesting units are configured to be rotated with respect to the housing about a common central axis by the drive shaft in use.

The outer housing may comprise a plurality of ducts which define a plurality of inlet channels and a plurality of outlet channels wherein the inlet channels are in fluid communication with the sidewalls of the water harvesting units, and wherein the outlet channels are in fluid communication with the annular outlets of the water harvesting units.

The ducts may be arranged so that the dimensions of the inlet and outlet channels vary along the length of the housing such that the dimensions of the inlet channels increase along the length of the outer housing in a first direction and the dimensions of the outlet channels decrease along the length of the outer housing in the first direction. The varying dimensions of the inlet and outlet channels enable mitigation of pressure drops as air flows therethrough.

The inlet channels may comprise air profiling devices configured to direct airflow into the vessel through the sidewalls in use.

The ducts may comprise a plurality of fins arranged along the length of the outer housing.

The outer housing may comprise a plurality of annular stator vane sets, wherein each stator vane set is located adjacent a sidewall of a water harvesting unit. The vane sets assist with directing airflow into the vessel via the sidewall in use.

In a further aspect, the invention provides a water harvesting system. The water harvesting system comprises: a plurality of water harvesting apparatuses as described above; a water harvesting apparatus manipulation system; a water adsorption station, wherein the water adsorption station comprises a first airflow supply system configured to supply air to the inlet channels of one or more of the water harvesting apparatuses; and a water desorption station, wherein the water desorption station comprises a second airflow supply system configured to supply air to the inlet channels of one or more of the water harvesting apparatuses. The water harvesting apparatus manipulation system is configured to move one or more of the water harvesting apparatuses from operative engagement with the first airflow supply system of the water adsorption station into operative engagement with the second airflow supply system of the water desorption station.

Equally, the water harvesting apparatus manipulation system may be configured to move one or more of the water harvesting apparatuses from operative engagement with the second airflow supply system of the water desorption station into operative engagement with the first airflow supply system of the water adsorption station.

The water harvesting apparatus manipulation system may be configured to move one or more water harvesting apparatuses from the water adsorption station to the water desorption station at the same time as moving one or more water harvesting apparatuses from the water desorption station to the water adsorption station.

The water desorption station may be hermetically sealed in use such that airflows within the water desorption station cannot interact with airflows external to the water desorption station. This prevents water vapour collected by airflows in the water desorption station from being driven out of the water desorption station as the vapour pressure therein changes during use.

The water harvesting apparatus manipulation system may comprise: a plurality of water harvesting apparatus manipulation members; a drive system configured to motivate the plurality of water harvesting apparatus manipulation members; and a control system configured to control the drive system.

The water harvesting apparatus manipulation members may be releasably attachable to the water harvesting apparatuses. The water harvesting apparatus manipulation members may be supported by a common central pivot, wherein the drive system is configured to motivate the manipulation members and/or the central pivot.

The water adsorption station may comprise a plurality of water adsorption stations, each configured to operatively engage with one or more water harvesting apparatuses.

In a still further aspect, the invention provides a method of harvesting water from the atmosphere. The method comprises: performing an adsorption cycle on a water harvesting apparatus; sealing the water harvesting apparatus in a hermetically sealed chamber; and performing a desorption cycle on the water harvesting apparatus.

The method may comprise performing a desorption cycle on a second water harvesting apparatus at the same time as performing the adsorption cycle on the water harvesting apparatus, wherein the second water harvesting apparatus is sealed in the hermetically sealed chamber.

The method may further comprise: moving the water harvesting apparatus into the hermetically sealed chamber and sealing the water harvesting apparatus within the hermetically sealed chamber; and moving the second water harvesting apparatus out of the hermetically sealed chamber.

In another aspect, the invention provides a water harvesting unit comprising an elongate cylindrical vessel having a central axis. The vessel comprises: an at least partially fluid-permeable cylindrical sidewall defining a vessel inlet; a vessel outlet located at each end of the vessel; and a filter located at each end of the vessel, wherein the filter comprises a foraminous material, and wherein, in use, the filter substantially prevents particulate material located within the vessel from exiting the vessel via the vessel outlets.

The filters may comprise an outer wall which is rotationally symmetrical about the central axis of the vessel, wherein the outer wall comprises a foraminous material. such filters comprise a closed end located at a first end of the outer wall, wherein the closed end comprises a foraminous material, and an open end located at a second end of the outer wall. The closed end of the filters are located within the vessel such that the closed ends of the filters face into the vessel towards each other. This filter configuration maximises the surface area of the filters within the vessel, minimising the pressure drop across the filters. In one embodiment the filters may be conical in shape and located within the vessel such that the tips of the conical filters point into the vessel towards one another.

In a further aspect, the invention provides a water harvesting apparatus. The water harvesting apparatus comprises a water harvesting unit as described above located in an outer housing and in operative engagement with a drive shaft, wherein the water harvesting unit is orientated such that the central axis of the vessel is horizontal, and wherein the water harvesting unit is configured to be rotated with respect to the housing about the central axis of the vessel by the drive shaft in use.

The outer housing may comprise an air inlet channel and an air outlet, wherein the air inlet channel is in fluid communication with the sidewall of the water harvesting unit, and wherein the air outlet is in fluid communication with the vessel outlets. The air inlet channel may have a volute configuration. The outer housing may have a volute configuration. The inlet channel may be configured to receive airflow at its widest end in use. The volute configuration of the air inlet channel and/or the outer housing serves to direct airflow into the vessel via the sidewall, in use, by pre-rotating the air before it comes into contact with the sidewall. The outer housing may comprise a plurality of stator vanes located adjacent the sidewall of the water harvesting unit. The stator vanes may further assist with direction of the airflow into the vessel in use.

In a still further aspect, the invention provides a water harvesting arrangement comprising: a cassette body having an opening; a plurality of water harvesting apparatuses as described above located within the cassette body and positioned so that that the central axes of each of the vessels of the water harvesting units are spaced from, and parallel to, one another.

The plurality of water harvesting apparatuses may be arranged in pairs along a length of the cassette body in a direction extending away from the opening. The spacing between the pairs of water harvesting apparatuses may decrease with increased distance of the pairs of water harvesting apparatuses from the opening of the cassette body.

The opening of the water harvesting arrangement may be in fluid communication with an inlet duct, which may in turn be in fluid communication with the water harvesting apparatuses. The inlet duct may narrow in width with increased distance away from the opening. This allows mitigation of the pressure drop that occurs as the distance from the opening increases.

In another aspect, the invention provides a water harvesting system comprising: a plurality of water harvesting arrangements as described above; a plurality of inlet manifolds, each inlet manifold in fluid communication with an opening of a respective water harvesting arrangement; and an airflow controller in fluid communication with each of the inlet manifolds, wherein the airflow controller is configured to control the flow of air into each of the inlet manifolds individually.

In a further aspect, the invention provides a water harvesting process system comprising: one or more water harvesting apparatuses as described above; an atmospheric air system comprising an air mover configured to supply a flow of atmospheric air to the inlet channel or channels of one or more water harvesting apparatuses to be operated, in use, in an adsorption mode; a desorption air system comprising an air mover configured to supply a flow of desorption air to the inlet channel or channels of one or more water harvesting apparatus to be operated, in use, in a desorption mode; and a heat exchanger configured to cool a flow of desorption air leaving the one or more water harvesting units operating in the desorption mode, in use, so that at least some of the water vapour contained in the flow of desorption air condenses within the heat exchanger.

The desorption air system may comprise a closed loop such that, in use, the desorption air flow passes through the one or more water harvesting units and the heat exchanger before being re-circulated to the inlet channel or channels of the one or more water harvesting units.

The desorption air system may also comprise a recuperative heat exchanger configured to facilitate heat exchange between the desorption air flow exiting the one or more water harvesting units and the desorption air flow returning to the one or more water harvesting units.

The heat exchanger may be pressurisable, and the desorption air system may comprise: a compressor located upstream of the heat exchanger, and downstream of the recuperative heat exchanger if present, with respect to the direction of desorption air flow in use; and an expander located downstream of the heat exchanger, and upstream of the recuperative heat exchanger if present, with respect to the direction of desorption air flow in use. Pressurising the heat exchanger artificially raises the dewpoint temperature within the heat exchanger, facilitating condensation of water carried by the desorption airflow.

The water harvesting process system may comprise a motor mounted on a common shaft which extends between the expander and the compressor.

The desorption air system may further comprise a separator located downstream of the recuperative heat exchanger, and upstream of the compressor with respect to the direction of desorption air flow in use. The separator may remove any water from the desorption airflow that condensed out of the airflow as it passed through the recuperative heat exchanger.

In a still further aspect, the invention provides a method of harvesting water from atmospheric air. The method comprises: passing a flow of atmospheric air through one or more water harvesting apparatuses as described above; stopping the flow of atmospheric air through the one or more water harvesting units; passing a flow of desorption air through the one or more water harvesting units; and cooling the flow of desorption air exiting one or more water harvesting units to recover liquid water from the flow of desorption air.

Cooling the flow of desorption air may comprise a first cooling step followed by a second further cooling step.

The method may further comprise: compressing the flow of desorption air before the second further cooling step; and expanding the flow of desorption air after the second further cooling step.

BRIEF DESCRIPTION OF THE DRAWINGS

The present invention will now be described by way of non-limiting examples with reference to the following figures, in which:

FIG. 8b shows a cross-sectional view of the vessel of FIG. 8a;

DETAILED DESCRIPTION

Figure 1:
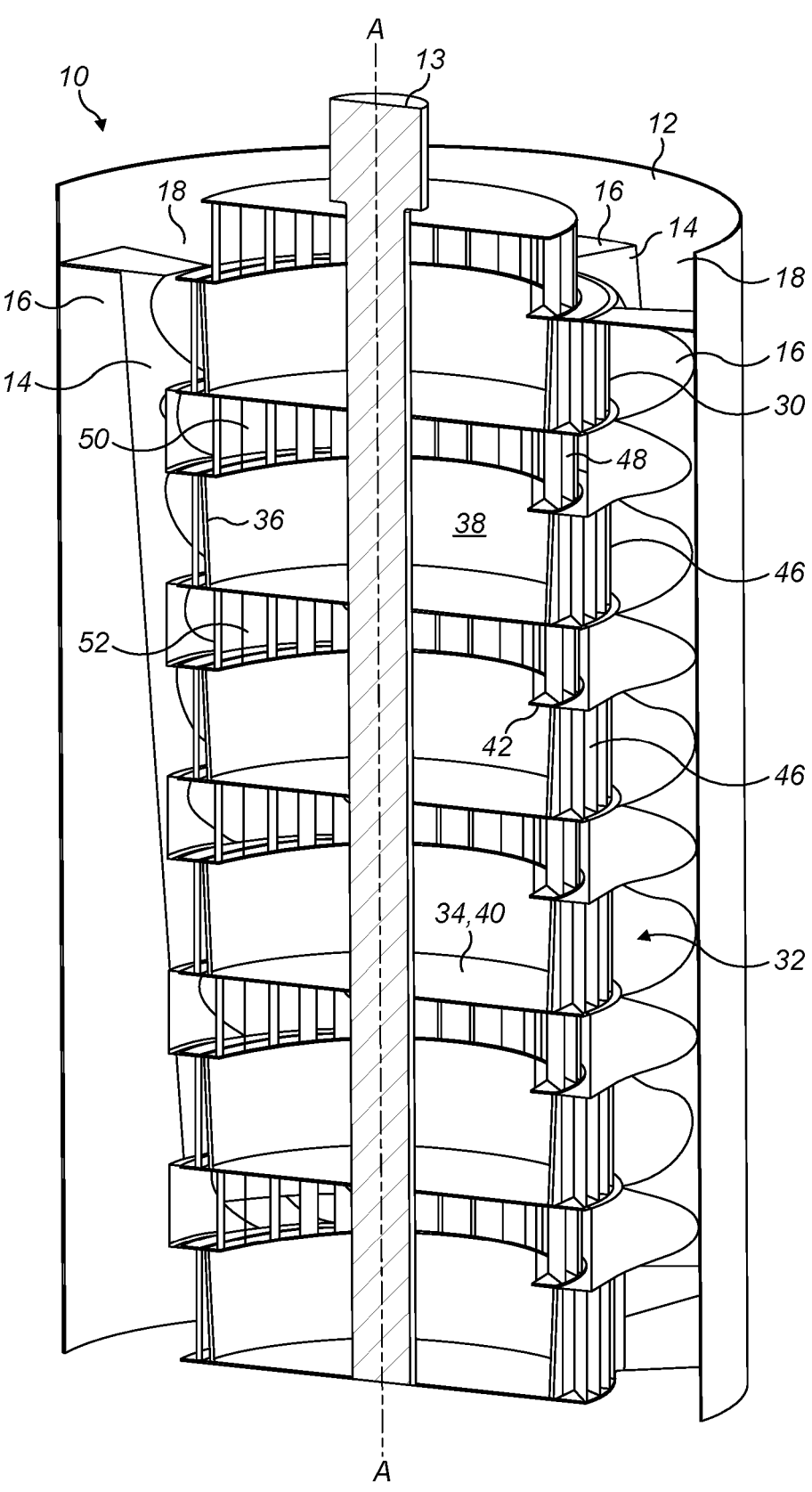
FIG. 1 shows a cross-sectional view of a water harvesting apparatus.
Figure 2:
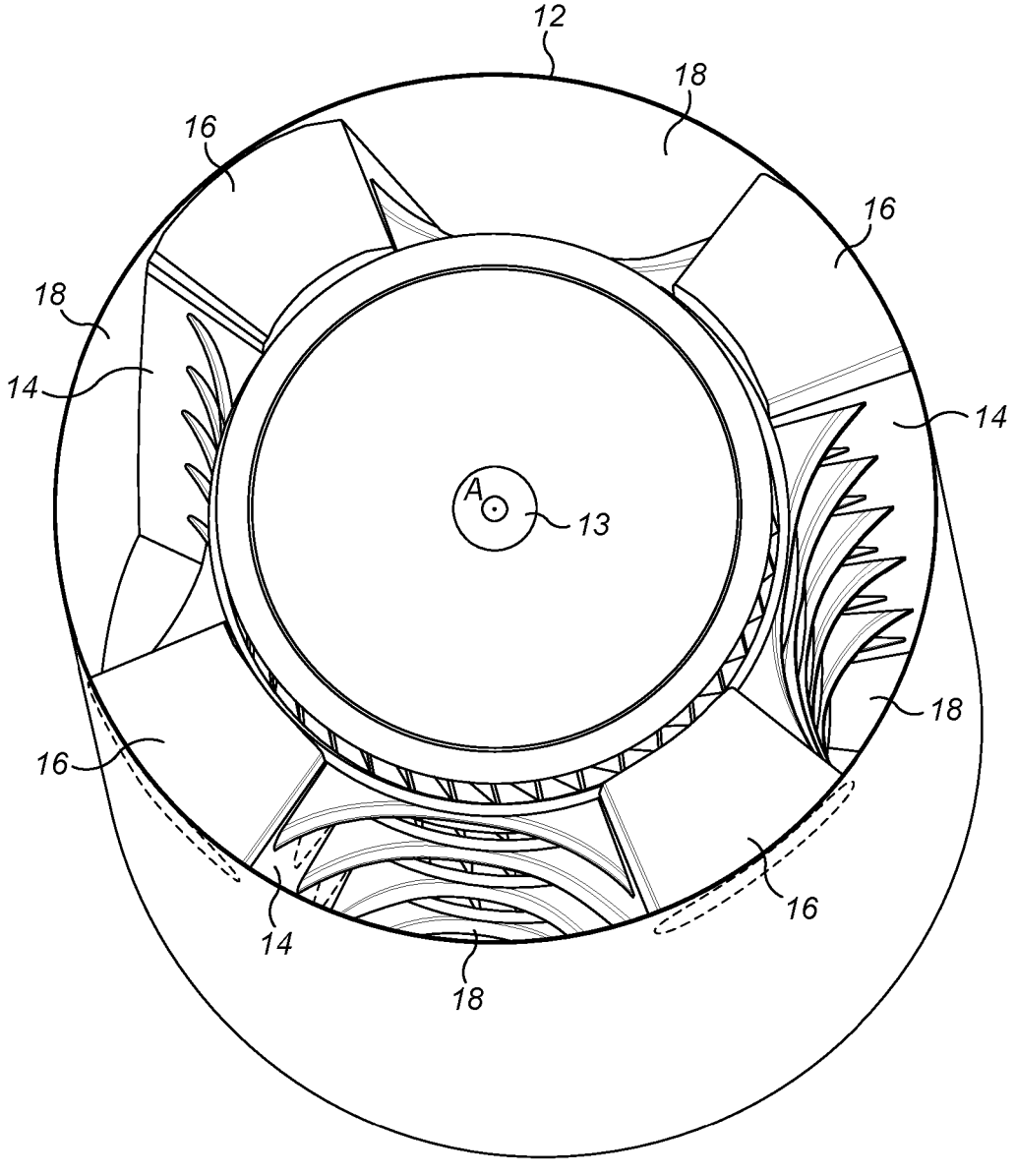
FIG. 2 shows a top view of the water harvesting apparatus of FIG. 1.

FIGS. 1 and 2 show a water harvesting apparatus 10 for harvesting water from atmospheric air. The water harvesting apparatus 10 comprises an outer housing 12 and a plurality of water harvesting units 30 contained within the housing 12 arranged in a stack. The water harvesting units 30 are mounted on a central drive shaft 13, which defines an axis A around which the water harvesting apparatus 10 is rotationally symmetric. The stack of water harvesting units 30 may be made up of a plurality of individual water harvesting units 30 stacked one upon another, or may be integrally formed together as a single component.

Figure 3:
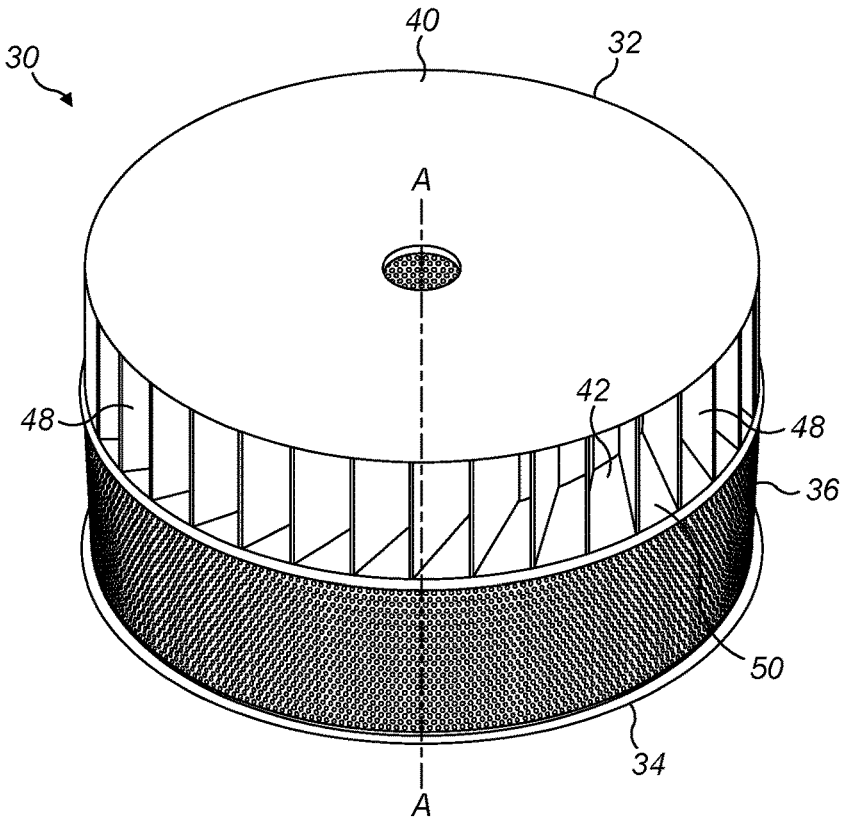
FIG. 3 shows a perspective view of a water harvesting unit.
Figure 4:
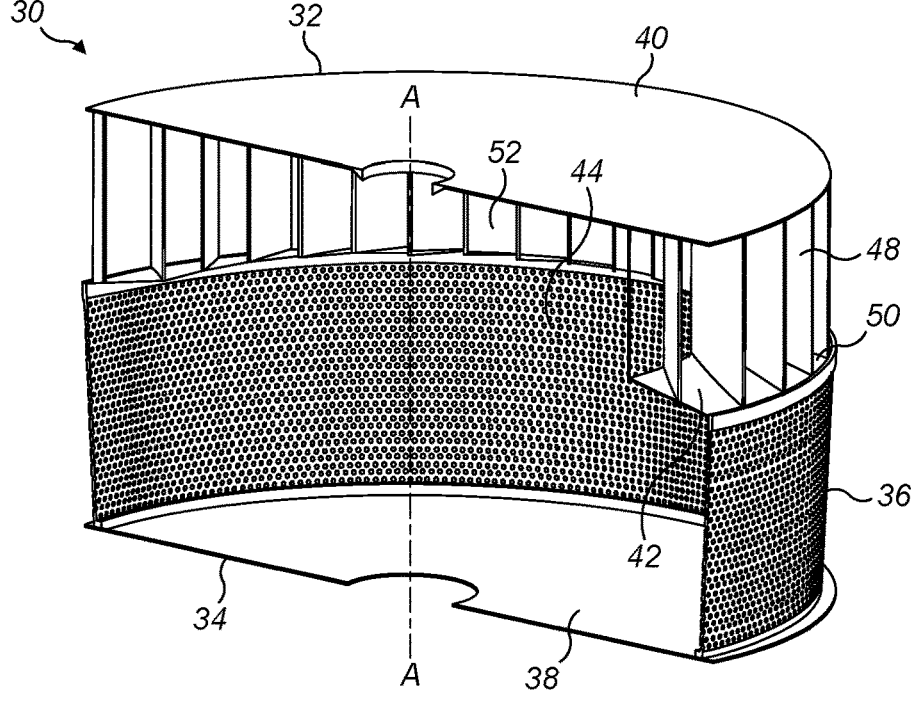
FIG. 4 shows a cross-sectional view of the water harvesting unit of FIG. 3.

FIGS. 3 and 4 show a single water harvesting unit 30 in more detail. Each water harvesting unit 30 is rotationally symmetric about the central axis A and comprises a vessel 32. The vessel 32 comprises a circular base 34, with sidewalls 36 rising from the base 34 and diverging away from the central axis A at a slight angle to the vertical as they extend away from the base 34. The base 34 and the sidewalls 36 together define a frustoconical first plenum space 38, within which a charge of particulate desiccant material (not shown) is received. The skilled person will appreciate that angle of divergence of the sidewall is adjustable. In an alternative example, the sidewalls 36 may be parallel to the central axis A such that the plenum space 38 is cylindrical.

A lip 42 extends inwardly from the top of the sidewall 36 to define an opening 44. The lip 42 may be arranged to be parallel with the base 34 or, as shown in the Figures, may extend away from the base 34 at a slight angle such that the lip is frustoconical in shape. The lip 42 helps to retain the charge of particulate desiccant material within the first plenum space 38 in use, as will be explained in further detail below. The base 34, sidewall 36 and lip 42 may each comprise a rigid plastics material such as acrylonitrile butadiene styrene (ABS) or polypropylene, for example.

A plurality of first, or inlet, vanes 46 form part of the housing 12. The inlet vanes 46 are arranged to be located around the sidewalls 36 of the water harvesting units 30 in the stack at an angle thereto. As will be discussed in more detail below, the angled arrangement of the inlet vanes 46 may assist with the entrainment of an airflow into the first plenum space 38 of the water harvesting unit 30 in use.

The water harvesting units 30 comprise a plurality of second, or outlet, vanes 48 which extend upwardly from the lip 42. The outlet vanes 48 are arranged at an angle, which may be similar to the angle of the inlet vanes 46, to direct air away from the water harvesting unit 30. The outer extremity of the outlet vanes 48 define an annular vessel outlet 50, and the lip 42 together with the outlet vanes 48 define a second plenum space 52, which is in fluid communication with the first plenum space 38 via the opening 44. The angled arrangement of the outlet vanes 48 may help direct air flow exiting the water harvesting unit 30.

The water harvesting units 30 further comprise a circular cover plate 40, which is arranged to be parallel to the base 34 of the vessel 32 and is positioned over the tops of the outlet vanes 48, opposite the opening 44. The cover plate 40 is fluid impermeable so that no air can pass therethrough and so that the only means of fluid communication between the second plenum space 52 and the environment external to the water harvesting unit 30 is via the annular vessel outlet 50. When arranged as part of the water harvesting apparatus 10 of FIGS. 1 and 2, adjacent water harvesting units 30 in the stack may each comprise a base 34 and a cover plate 40 or alternatively may comprise a single plate which simultaneously acts as a cover plate 40 for a lower water harvesting unit 30 and a base 34 for an adjacent water harvesting unit 30.

Like the cover plate 40, the base 34 and the lip 42 of the vessel 32 are fluid impermeable so that no air can pass through these portions of the vessel 32. In contrast to this, the sidewall 36 of the vessel 32 comprises a plurality of holes such that the sidewall 36 is at least partially perforated or foraminous and fluids such as air can pass through. In an example, the holes in the sidewall 36 may be about 1 mm in diameter, arranged on a 2 mm triangular pitch with a free area of approximately 35% of the surface area of the sidewall 36. The holes may also have 0.5 mm radiused edges on both the inlet and outlet sides thereof. The skilled person will understand that any suitable size, depth and coverage of holes may be used and that a number of factors determines the optimum combination of these quantities. A free area of less than 50% is preferable.

The inner or outer surface of the sidewall 36 may be covered by a sidewall lining (not shown) made from a flexible porous material, such as nylon, polyester or polypropylene fibre mesh. The average pore size of the porous material is preferably small enough to prevent escape of the particulate desiccant material from the first plenum space 38. The porous material may be made by weaving, printing, piercing, or any other method suitable to produce such a material.

A preferred material for the charge of particulate desiccant material is a metal-organic framework (MOF) material such as aluminium fumarate. It has been found in tests that particulate MOF material, when used in water harvesting apparatuses such as described herein, is able desorb water at air temperatures as low as 55° C., thereby lending themselves to the use of 'low grade' heat sources for the provision of heating power. This has benefits from both an environmental and efficiency standpoint.

Figure 5:
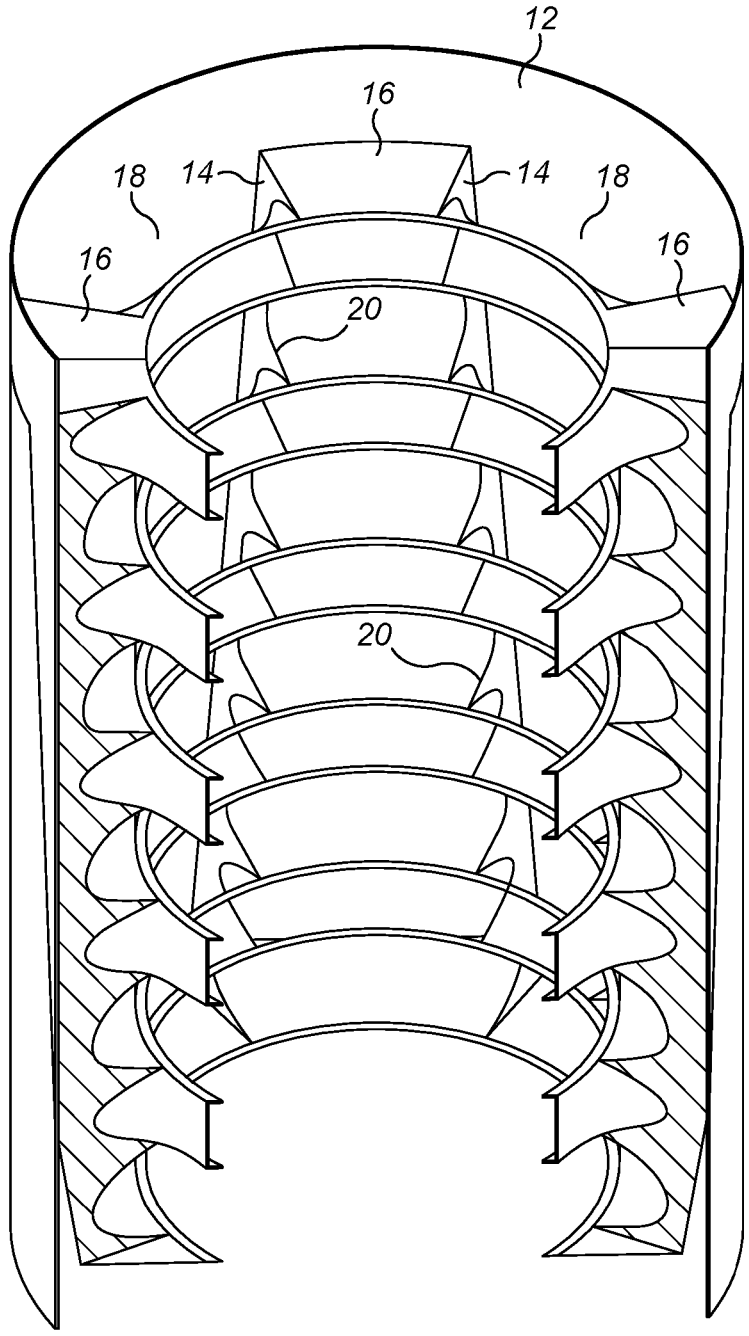
FIG. 5 shows a cross-sectional view of a housing of the water harvesting apparatus of FIGS. 1 and 2.

Turning now to FIG. 5, which shows the housing 12 of the water harvesting apparatus 10 in greater detail without the stack of water harvesting units 30 in place. The housing 12 comprises a plurality of ducts 14 that define a plurality of respective inlet channels 16 and outlet channels 18 around the periphery of the housing 12. In this embodiment the ducts 14 are fin shaped. However, this is not essential. The ducts 14 are angled with respect to the vertical so that the width of the inlet and outlet channels 16, 18 changes from the bottom (with respect to the orientation of FIG. 5) to the top of the housing 12. As most clearly shown in FIG. 1, this results in the inlet channels 16 decreasing in dimension from the bottom to the top of the housing 12, and the outlet channels 18 increasing in dimension from the bottom to the top of the housing 12. In use, this helps to avoid pressure drop variations in the respective airflows. The housing 12 of FIG. 5 and the water harvesting apparatus 10 of FIGS. 1 and 2 are designed for air to enter from the bottom of the housing 12 (as shown in the Figures) and to leave from the top of the housing 12 (as shown in the Figures). The inlet channels 16 are therefore wider at the bottom of the housing 12 and narrower at the top, while the reverse is true of the outlet channels 18.

With reference to FIGS. 1 to 5, with the water harvesting units 30 in place on the central drive shaft 13 within the housing 12, in use, air from the inlet channels 16 flows through the inlet vanes 46 and through the sidewalls 36 of the water harvesting units 30 into the first plenum spaces 38 of the vessels 32. Air flows out of the second plenum spaces 52 via the outlet vanes 48 into the outlet channels 18. The inlet channels 16 are therefore only in fluid communication with the first plenum spaces 38 and the outlet channels 18 are only in fluid communication with the second plenum spaces 52. To this end, the inlet channels 16 include panels (not shown) adjacent the outlet vanes 48 to prevent air flowing from the inlet channels 16 into the outlet vanes 48 and the second plenum spaces 52. In a similar way, the outlet channels 18 also include panels (not shown) adjacent the inlet vanes 46 to prevent air flowing into the outlet channels 18 out of the first plenum spaces 38. It will be appreciated that, since there are a plurality of inlet and outlet channels 16, 18 around the periphery of the housing 12, air flows into the first plenum spaces 38 at a plurality of locations around the sidewall 36 of each water harvesting unit 30 and flows out of the second plenum spaces 52 at a plurality of locations around the vessel outlets 50.

Trumpet-shaped air profiling devices 20 may be located within the inlet channels 16 extending from the ducts 14. The air profiling devices 20 may help to direct the airflow in the inlet channels 16 into the inlet vanes 46 of the water harvesting units 30 in such a way that the air is entrained in the existing flow of air within the first plenum space 38.

The purpose of the water harvesting apparatus 10 is to extract water present in atmospheric air via the charge of particulate desiccant material. Water in incoming air is adsorbed by the particulate desiccant material in an adsorption cycle, with the dehumidified air then allowed to vent back into the atmosphere. Water is then desorbed from the particulate desiccant material in a desorption cycle and collected.

To operate the water harvesting apparatus 10 in an adsorption mode of operation and carry out an adsorption cycle, the central drive shaft 13 is rotated, driving rotation of the water harvesting units 30. Rotation of the water harvesting units 30 causes the charge of particulate desiccant material contained in each of the water harvesting units 30 to be forced against the sidewall 36 of the vessel 32 under the action of a centrifugal force.

Incoming air from the inlet channels 16 enters the first plenum space 38 of the respective water harvesting units 30 through the rotating sidewall 36 and the sidewall lining (if present) via the static inlet vanes 46 in a predominantly radial direction and is entrained within the rotating action of the vessel 32, aided by the inlet vanes 46 and the air profiling devices 20 in the inlet channels 16 (if present). The air enters the first plenum space 38 at a speed sufficient to at least partially fluidise the annular charge of particulate desiccant material, helping to ensure good contact between the airflow and the desiccant material.

In trials, aluminium fumarate was used as the particulate desiccant material. A 100 g charge of particles with an average particle size of between 0.3 mm to 1 mm was loaded into vessels 32 of approximately 190 mm in diameter. The drive shaft 13 and hence the water harvesting units 30 were rotated at a speed of 200 rpm, causing a centrifugal force of approximately 5 G to act on the charge of particulate aluminium fumarate. In the adsorption mode of operation, an airflow rate of approximately 15 litres per second was passed through the water harvesting units 30, which produced a sufficiently fluidised charge of desiccant material. The skilled person will understand, however, that these parameters are highly dependent on the type, amount and size of the particles of desiccant material and also on the geometry of the water harvesting units 30 and the perforations in the sidewall 36 and so other combinations of parameters will also prove effective.

As a result of the sidewall 36 diverging slightly away from the central axis A as it extends away from the base 34, the depth of the annular charge may be controlled so that it is substantially consistent over its height to help ensure a uniform pressure drop across the height of the annular charge in use. The exact angle of divergence is dependent on the characteristics of the particulate desiccant material. A typical range for the angle of divergence of the sidewall 36 from the central axis may be in the range of 1° to 10°, while FIGS. 3 and 4 show a divergence angle of approximately 3°. The pressure drop can be tuned by the size and the distribution of holes in the sidewall 36, as well as by the loading of particulate desiccant material within the vessel 32. Overloading the vessel 32 with desiccant material has been found to be unproductive as the pressure drop across the charge of desiccant material becomes too great and more fan power is required to fluidise the material when the vessel 32 is rotated.

Contact between the incoming air and the fluidised annular charge of particulate desiccant material allows the water in the inlet air to be adsorbed by the desiccant material. Without a uniform pressure drop across the fluidised annulus, there is a risk of 'jetting' of the airflow, which reduces contact between the air and the desiccant material and also risks entrainment of the particulate desiccant material in the airflow.

The presence of the lip 42 reduces the velocity of air moving inwards from the sidewall 36 towards the centre of the first plenum space 38, thereby reducing entrainment of particles of desiccant material within the outgoing airflow and minimising elutriation of the desiccant material. In FIGS. 3 and 4, the lip is angled at about 10° to the base 34 but this angle may generally fall in the range between 0° and 15°. Angling the lip 42 in the manner shown in FIGS. 3 and 4 serves to increase the radial and vertical cross-sectional flow area, leading to a further reduction in the velocity of air moving away from the sidewall 36, further minimising elutriation of the desiccant material.

After the air passes through the opening 44 into the second plenum space 52, it eventually leaves the water harvesting unit 30 via the vessel outlet 50 and the outlet vanes 48. The outlet vanes 48 essentially form a centrifugal fan, with the rotation of the water harvesting unit serving to expel the air outwards. The outlet vanes 48 therefore provide some pressure gain, aiding with the outgoing flow of air from the water harvesting unit 30 and into the outlet channels 18.

The skilled person will understand that the principles described above with reference to the water harvesting apparatus 10 being used to adsorb water in incoming air are equally applicable to use of the water harvesting apparatus 10 in desorbing water adsorbed by the charge of particulate desiccant material.

Figure 6:
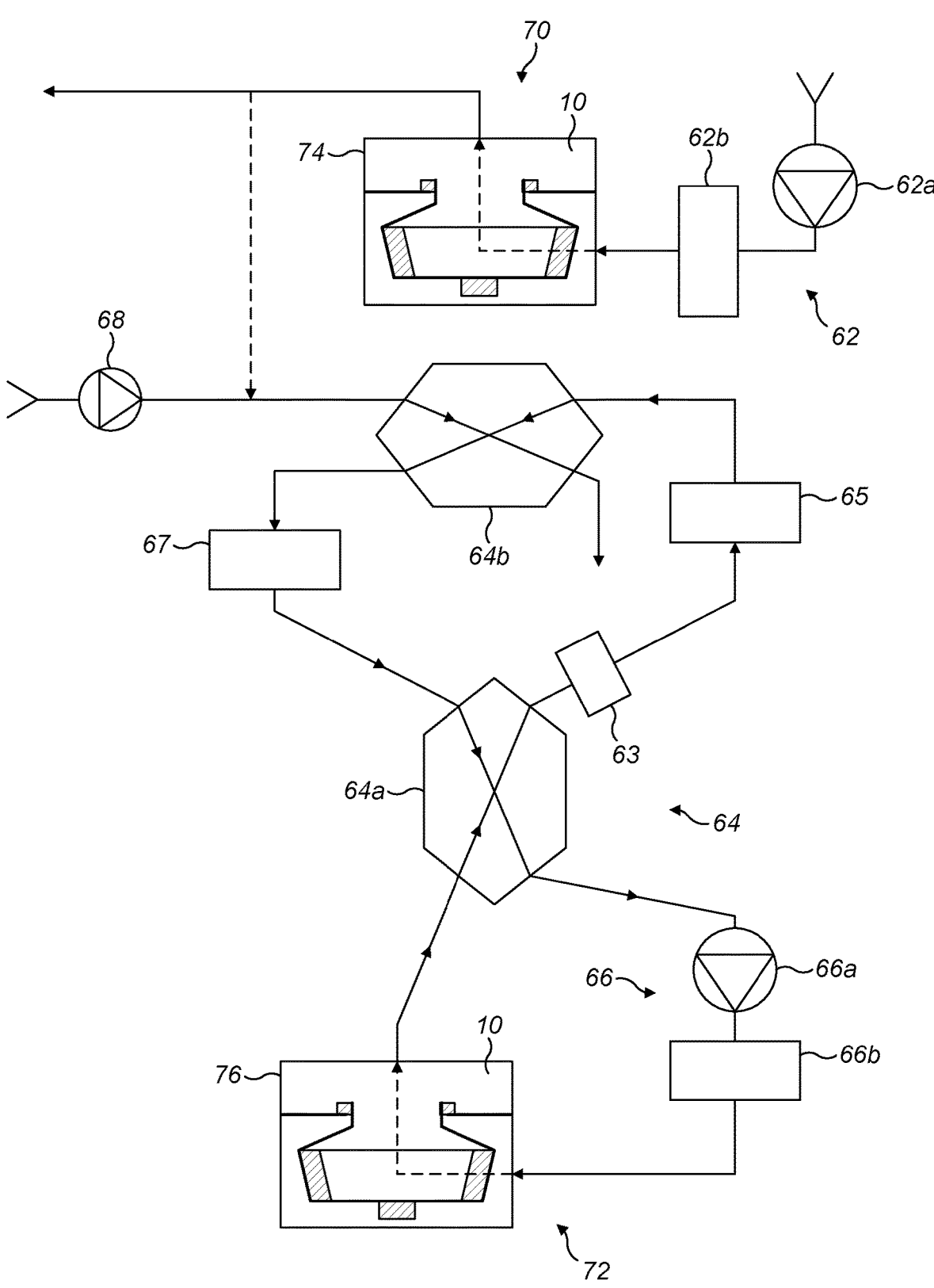
FIG. 6 shows a schematic diagram of a water harvesting system.

In use, the water harvesting apparatus 10 forms part of a water harvesting process system 60, such as that shown here in FIG. 6.

To summarise, when water is being adsorbed in an adsorption cycle, atmospheric air is fed into the inlet channels 16 of the water harvesting apparatus 10 by an atmospheric air system 62, which comprises an air mover such as a blower 62*a* and, optionally, a chiller 62*b*. Certain desiccant materials, including MOFs such as aluminium fumarate, only adsorb moisture up to a certain temperature and use of systems comprising these desiccant materials in hot ambient temperatures therefore requires the air to be cooled before it enters the inlet channels 16 to ensure the air temperature is within the operating range of the desiccant material. Once exhausted through the outlet channels 18 of the water harvesting apparatus 10, the air is then carried away and can be optionally diverted to a heat exchange system 64. The adsorption cycle is continued until the charge of particulate desiccant material has become saturated with water, or it is determined that the adsorption cycle should otherwise come to an end.

To desorb the water that has been adsorbed by the charge of particulate desiccant material in a desorption cycle, the central drive shaft 13 is again rotated, with the combined action of the rotation of the vessels 32 and the incoming air once again serving to fluidise the charge of desiccant material. In the desorption mode of operation, the central drive shaft is rotated at a speed as low as 120 rpm, with a corresponding airflow rate in the desorption mode of operation of 5 litres per second. This is still sufficient to fluidise the charge of particulate desiccant material under these conditions. In contrast to an adsorption cycle, in a desorption cycle air is delivered to the inlet channels 16 via heated air system 66 comprising an air mover such as a blower 66*a* and a heater 66*b*, to increase the temperature of the air and so aid desorption of the water. Having passed through the water harvesting units 30 and into the outlet channels 18, the air is carried away from the water harvesting apparatus 10.

Air exhausted from the water harvesting apparatus 10, which contains the water desorbed from the charge of particulate desiccant material, then enters the heat exchange system 64, which forms a closed loop with the desorption air system 66. The air first enters a first heat exchanger 64*a*, where it gives up some of its heat to the return flow of air heading back to the desorption air system 66. The first heat exchanger 64*a* may therefore also be called a recuperative heat exchanger 64*a*. From here, the now slightly cooler air passes through a compressor 65, which increases the pressure of the cooled air before it enters a second heat exchanger 64*b*, which acts as a condenser.

The pre-cooling of the air in the first heat exchanger 64*a* may cause some condensation of water out of the airflow. The compressor 65 spins at a very high speed, approximately 100,000 rpm. Any droplets of water carried in the airflow when it enters the compressor 65 will therefore impinge upon the impeller of the compressor 65 and will cause high levels of wear due to the velocity at which the impeller rotates. It is therefore desirable to remove any droplets of water that may have formed when passing through the first heat exchanger 64*a* from the airflow before it enters the compressor 65. To this end, the heat exchange system 64 may further comprise a separator 63 to separate out any condensed water droplets from the airflow. The separator may take the form of a simple mesh pad, a set of baffle plates or a filter. Water from the separator may optionally be collected.

Once the airflow has entered the second heat exchanger 64*b*, the pre-cooled air containing the desorbed water is further cooled by either the air exhausted from the water harvesting apparatus 10 undergoing an adsorption cycle, or by atmospheric air supplied by a blower 68, or a combination thereof. This further cooling causes the desorbed water to condense out of the air so it can be collected. The second heat exchanger 64*b* is contained in a pressurised enclosure in order to artificially increase the dewpoint temperature and thereby aid condensation of the water out of the airflow.

After flowing out of the second heat exchanger 64*b*, the air passes through an expander 67, which reverses the pressure increase of the air caused by its passage through the compressor 65. In this way, the compressor 65 and expander 67 work in much the same way as a turbocharger works in a car engine. However, the mechanical efficiency of the compressor 65 and expander 67 would not be 100%, and so an auxiliary drive motor (not shown) would be attached to a common shaft (also not shown) joining the compressor 65 and expander 67 in order to make up for energy deficit in the mechanical operation of the compressor 65 and expander 67.

From the expander 67, the air flows back through the first heat exchanger 64*a*, where it is pre-heated by the hot air just exhausted from the water harvesting apparatus 10 undergoing a desorption cycle, before returning to the desorption air system 66 and travelling back through the water harvesting apparatus 10.

It may be beneficial for the whole of the closed loop of the desorption airflow to be hermetically sealed, to help avoid the increasing vapour pressure in the loop acting to drive the water vapour out of the system, thereby reducing its efficiency.

There may consequently be a difference in the set-up of the water harvesting process system 60 around the water harvesting apparatus 10 in the respective adsorption and desorption cycles and respective water adsorption and water desorption regions 70, 72 may be defined. Within the water adsorption and water desorption regions 70, 72, respective individual water adsorption and water desorption stations 74, 76 may be defined.

It will be clear to the skilled person that individual water harvesting apparatuses 10 may each be configured with their own water harvesting process system 60 or the water harvesting apparatuses 10 may be connectable to a common water harvesting system 80, as described below.

Figure 7A:
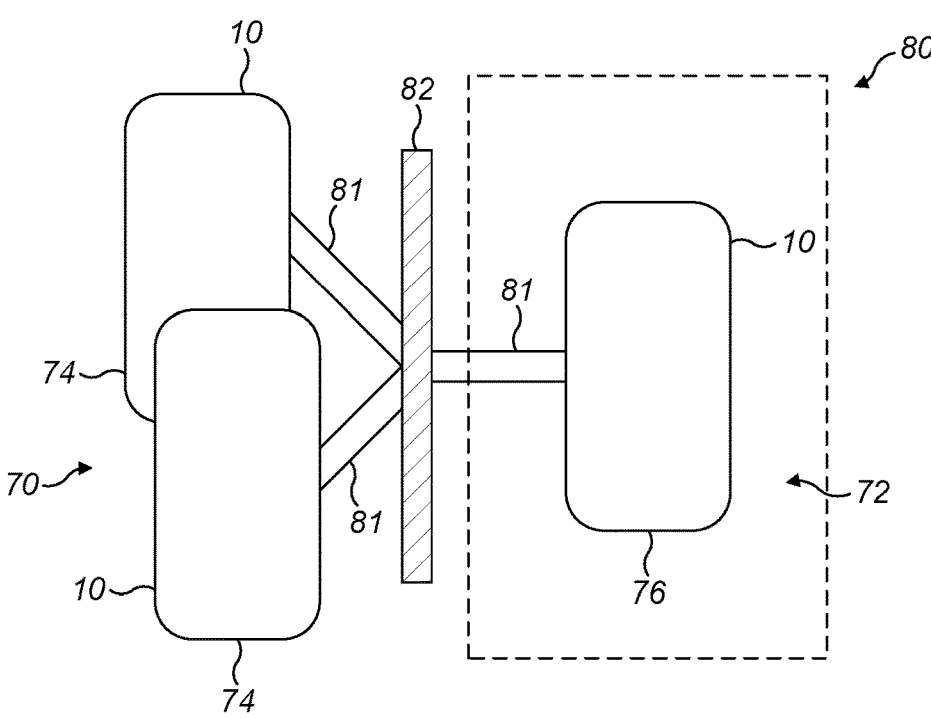
FIGS. 7a and 7b show schematic side and top views of a water harvesting arrangement.
Figure 7B:
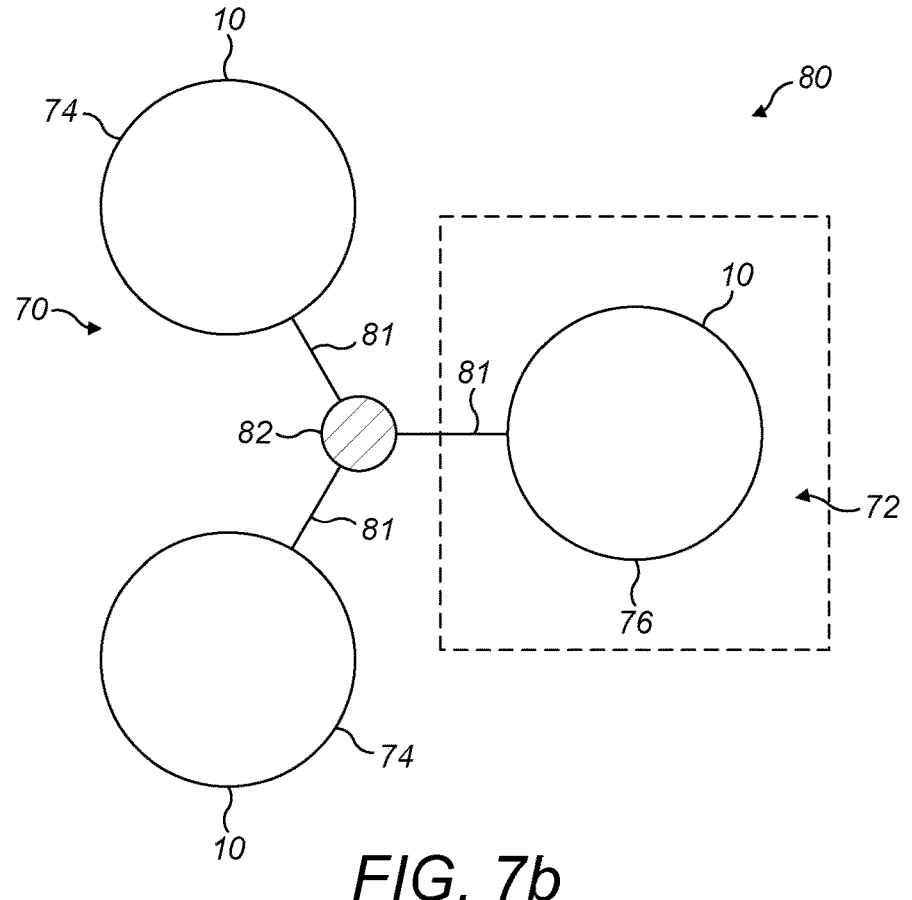

Turning now to FIGS. 7*a* and 7*b*, which show a water harvesting system 80 comprising a plurality of water harvesting apparatuses 10 arranged around a central pivot 82. In FIGS. 7*a* and 7*b*, three water harvesting apparatuses 10 are shown, but this is not intended to be limiting and it will be appreciated that more or less water harvesting apparatuses 10 may be arranged around the central pivot 82 than shown in the Figures.

The water harvesting apparatuses 10 are connected to the central pivot 82 by water harvesting apparatus manipulation members, or arms, 81 which are attached to the water harvesting units 10 and arranged so that rotation of the central pivot 82 causes rotation of the water harvesting units 10 about the central pivot 82. In an alternative arrangement, the manipulation arms 81 may rotate about the central pivot 82 which remains stationary in use. The manipulation arms 81 may be fixed to the water harvesting apparatuses 10, or they may be releasably attached to the water harvesting units 10. A drive system (not shown) configured to motivate the plurality of manipulation arms 81, and a control system (not shown) configured to control the drive system are also provided.

In this embodiment, the central pivot 82 is configured to rotate to move the respective water harvesting apparatuses 10 attached thereto, allowing the respective water harvesting apparatuses 10 to move position, for example between the water adsorption and water desorption regions 70, 72, or between different water adsorption or desorption stations 74, 76.

In this way, the water harvesting system 80 provides a convenient way for transferring the water harvesting apparatuses 10 between the water adsorption and water desorption regions 70, 72. In particular, the water harvesting system 80 allows for one or more water harvesting apparatuses 10 to be adsorbing water at a respective one or more water adsorption stations 74 within the water adsorption region 70, while one or more other water harvesting apparatuses 10 are desorbing water at a respective one or more water desorption stations 76 within the water desorption region 72. Typically, water desorption cycles are quicker than water adsorption cycles and so there may be more water adsorption stations 74 in the water adsorption region 70 than water desorption stations 76 in the water desorption region 72.

In FIGS. 7a and 7b, there are two water adsorption stations 74 in the water adsorption region 70 and only one water desorption station 76 in the water desorption region 72. Accordingly, while first and second water harvesting apparatuses 10 are undergoing adsorption cycles at first and second water adsorption stations 74 in the water adsorption region 70, a third water harvesting apparatus 10 is undergoing a desorption cycle at the sole water desorption station 76 in the water desorption region 72. When the third water harvesting apparatus 10 has finished the desorption cycle, the water harvesting system 80 is rotated so that the third water harvesting apparatus 10 is moved to the first water adsorption station 74, the first water harvesting apparatus 10 is moved to the second water adsorption station 74 and the second water harvesting apparatus 10 is moved to the water desorption station 76.

Therefore, in the arrangement shown in FIGS. 7a and 7b, the water harvesting apparatuses 10 each experience the adsorption cycle in two parts, a first part at the first water adsorption station 74 and a second part at the second water adsorption station 74. Naturally, if the water harvesting system 80 comprised more than three water harvesting apparatuses 10, further water adsorption and/or desorption stations 74, 76 may be present and the adsorption and/or desorption cycles may be split into further parts.

Figure 8A:
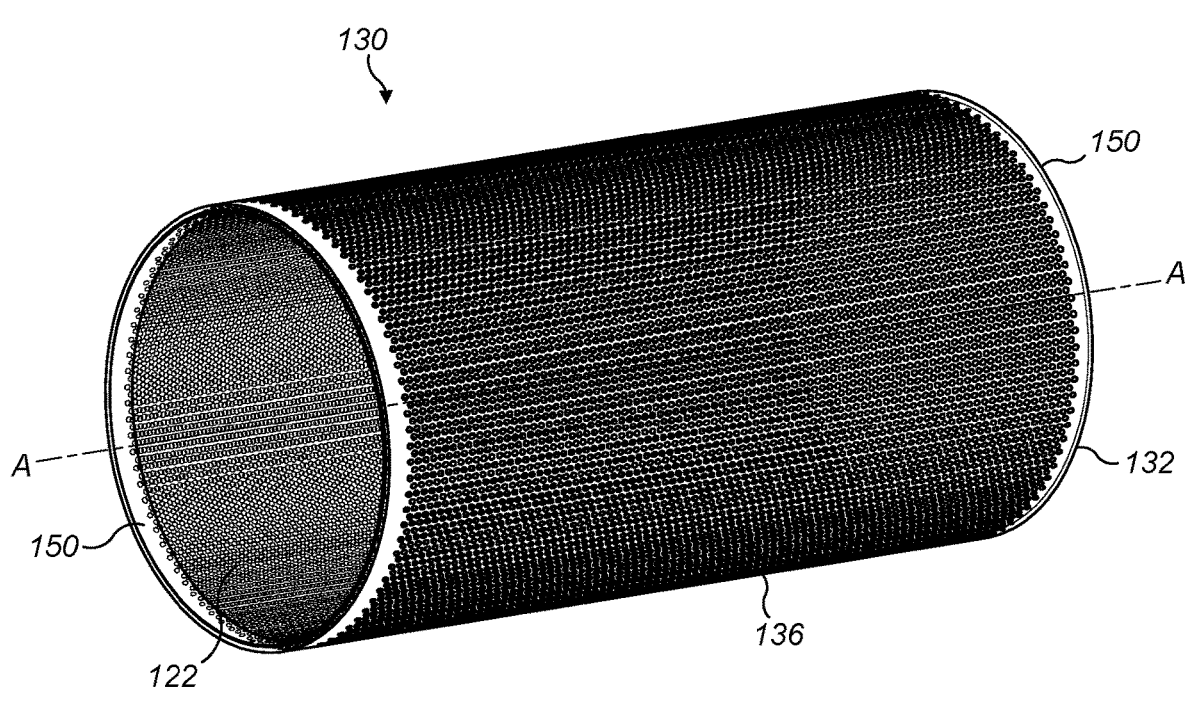
FIG. 8a shows a vessel of a water harvesting unit.
Figure 8B:
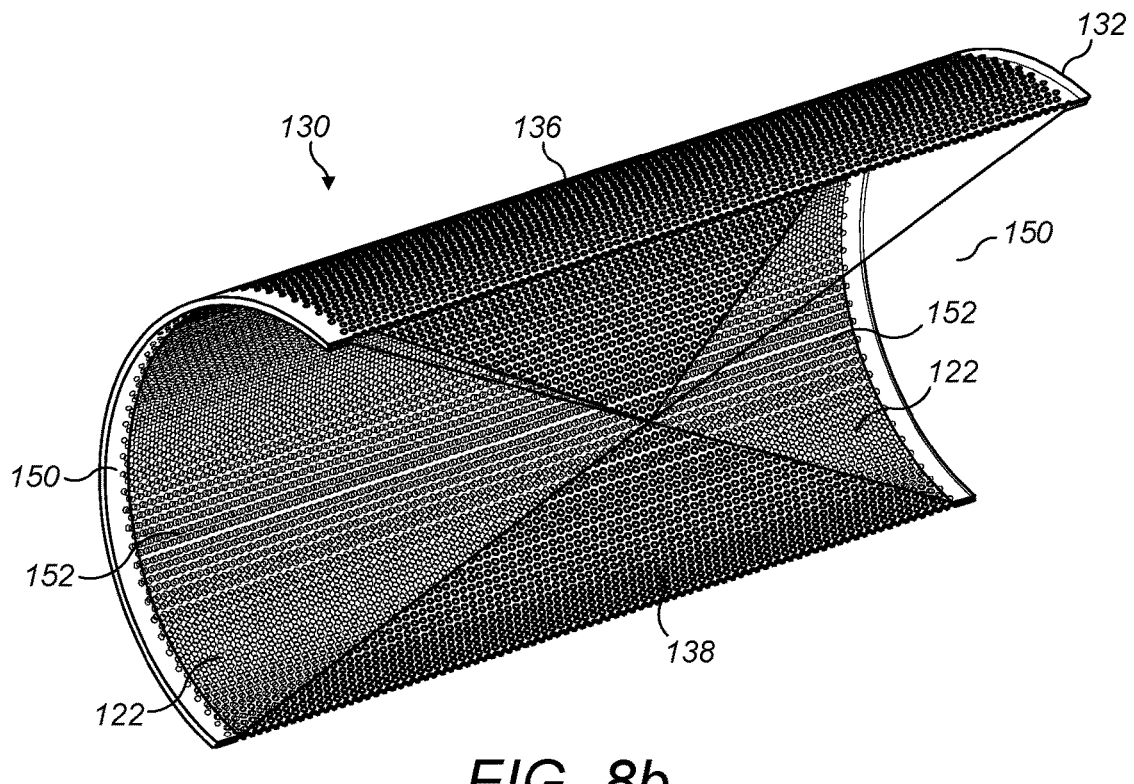

Turning now to FIGS. 8a and 8b, which shows an alternative water harvesting unit 130. Like the water harvesting units 30 discussed above and shown in FIGS. 3 and 4, the water harvesting unit 130 shown in FIGS. 8a and 8b is rotationally symmetric about a central axis A and comprises a vessel 132 with an at least partially perforated, or foraminous, sidewall 136, within which is received a charge of particulate desiccant material (not shown), such as the particulate MOF material already described above. However, unlike the water harvesting unit 30 of FIGS. 3 and 4, which is designed for its central axis A to be arranged substantially vertically in use, the central axis A of the water harvesting unit 130 of FIGS. 8a and 8b is designed to be arranged substantially horizontally in use. Consequently, the vessel 132 of the water harvesting unit 130 of FIGS. 8a and 8b has a different aspect ratio compared to the water harvesting unit 30 of FIGS. 3 and 4 such that it is longer in the direction of the central axis A. As a result of the different orientation in which it is operated, the vessel 132 of the water harvesting unit 130 of FIGS. 8a and 8b is also substantially cylindrical, in contrast with the water harvesting unit 30 of FIGS. 3 and 4, which has a cross-section that changes along the length of the central axis A.

The sidewall 136 does not extend over the ends of the vessel 132. However, to prevent the charge of desiccant material from being expelled from the vessel 132 when the water harvesting unit 130 is in use, a mesh filter 122 may cover the ends of the vessel 132. The size of the perforations in the mesh are determined by the size of the particles of desiccant material. The mesh filters 122 may simply cover the respective ends of the cylindrical vessel 132, however, to minimise the pressure drop across the filters 122, it is preferable to maximise the surface area of the filters 122. The filters 122 may therefore extend inwardly from the ends of the vessel 132 to define conical second plenum spaces 152, whose bases are coincident with the ends of the vessel 132. In this way, the filters 122 separate the first plenum space 138, containing the charge of desiccant material, from the second plenum spaces 152 at the ends of the vessel 132.

The filters 122 may be other shapes such as cylindrical or frustoconical, or any other shape which as a radially wider end proximate the ends of the vessel 132 and radially narrower ends facing into the vessel 132 towards one another. The tapering shape of the filters allows for the fluidised bed of particulate desiccant material to form, uninterrupted by the filters 122, to its working depth in use.

The size and distribution of the perforations in the sidewall 136 of the vessel 132, like those in the filters 122, must take into consideration the pressure drop across the sidewall 136 as air enters the vessel 132 therethrough. However, unlike the filters 122, the design of the sidewall 136 must also take into consideration the resultant air distribution through the charge of particulate desiccant material. If the sidewall 136 is too permeable, air passing though the desiccant may form so-called 'jets' or 'plumes', which results in a noticeable reduction in the adsorption and desorption performance of the water harvesting unit 130 as a significant proportion of the air passes through the charge of desiccant without interacting with the particles.

Tests with commercially available perforated aluminium sheet with a pore size of 2 mm on a 3.5 mm pitch with a free area of between 35% and 40% showed viability of the design. However, the inlet outlet edges of the holes in this sheet are sharp, which creates disturbance in the airflow as it passes through the sidewall 136. It is preferable for the sidewall 136 to comprise a finer perforation pattern having, for example, a pore size of approximately 1 mm and a free area of approximately 35%. It is also preferable to include radiused surfaces on the entrance and/or exit to the perforations to smooth the edges of the perforations. It is important to note that the precise perforation pattern in the sidewall 136 is not determinative of its performance and that a fine hole pattern with a free area of between 35% and 40% should perform to the requisite standard.

As with the embodiment shown in FIGS. 1 to 7, a mesh sidewall lining on the inside of the sidewall 136 performs the role of preventing the charge of particulate desiccant material falling out of the vessel 132 and therefore has a pore size that is smaller than the size of the desiccant particles. The sidewall lining may also help to even out the distribution of air entering the vessel 132, helping to ensure good interaction between the airflow and the charge of desiccant material.

Figure 9A:
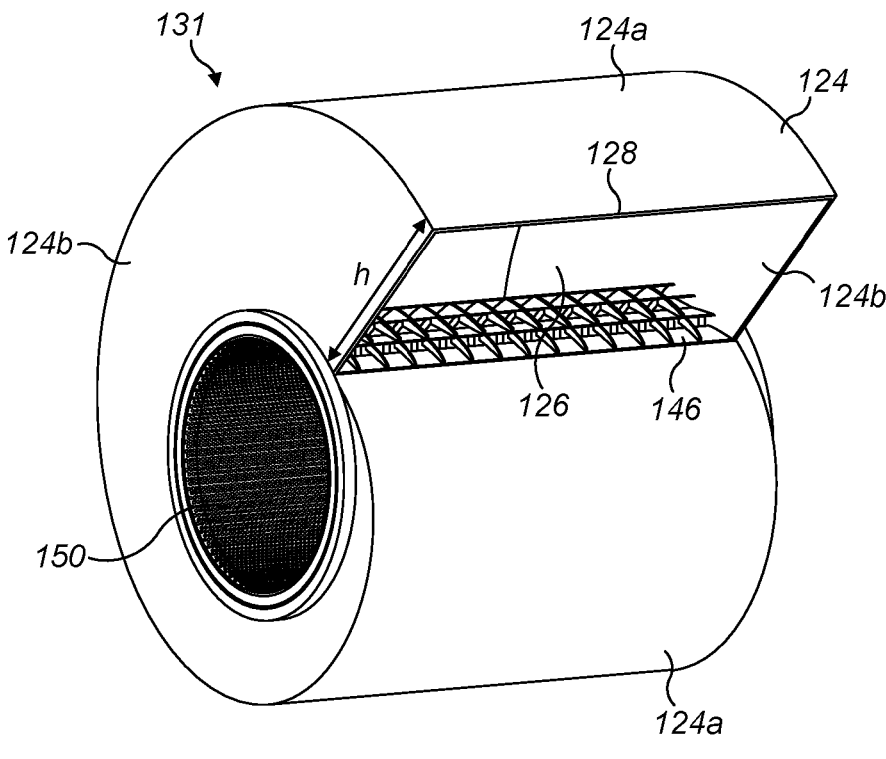
FIG. 9a shows a water harvesting unit with the vessel of FIGS. 8a and 8b.
Figure 9B:
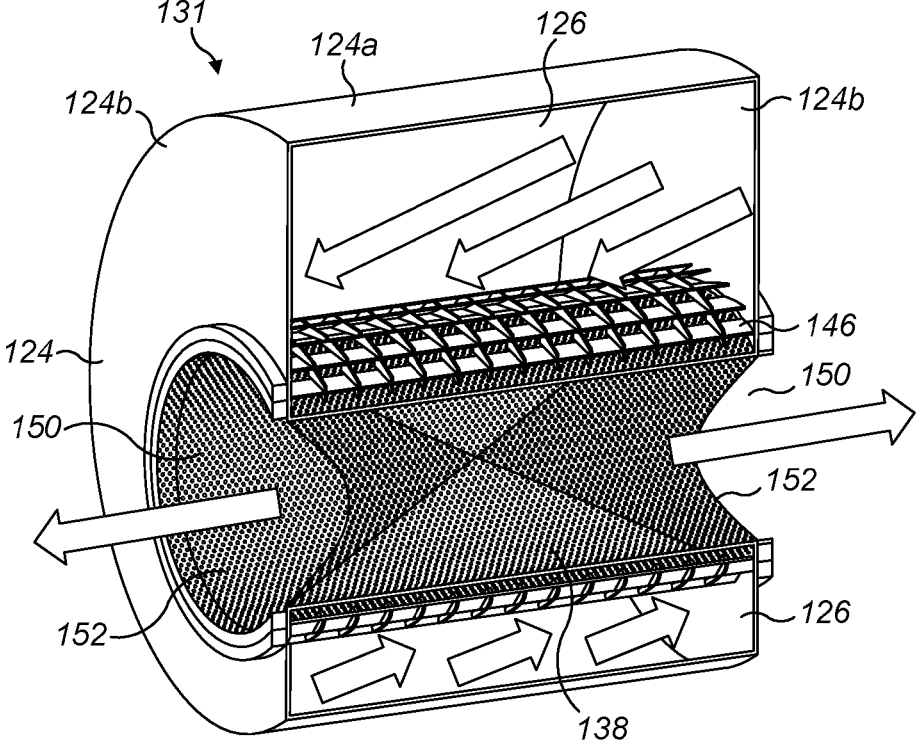
FIG. 9b shows a cross-sectional view of the water harvesting unit of FIG. 9b.

In use, the water harvesting unit 130 is located within an outer housing 124. Together the water harvesting unit 130 and the outer housing 124 comprise a water harvesting apparatus 131. As seen in FIGS. 9a and 9b, the housing 124 is substantially volute in form and extends around substantially the whole outer surface of the sidewall 136. The outer housing 124 comprises a main wall 124a, spaced apart from the vessel sidewall 136 in a radial direction, and two end walls 124b arranged at each end of the vessel 132. The housing 124 and sidewall 136 together therefore define a chamber 126 having a height h corresponding to the radial separation between the main wall 124a of the housing 124 and the sidewall 136 of the vessel 132.

Each of the end walls 124b and the main wall 124a of the housing 124 have a respective terminus, allowing the housing 124 to define a housing inlet 128 where the chamber 126 is in fluid communication with the environment external to the water harvesting unit 130. As can be seen in FIG. 9a, the height h of the chamber 126 is at, or near, a maximum at the housing inlet 128 and gradually tapers as the main wall 124a extends around the sidewall 136 of the vessel 132, eventually reaching a minimum when the main wall 124a has fully encircled the vessel 132. This minimum height may be zero, as shown in the example of FIG. 9a, to avoid blocking of the housing inlet 128. As will be explained in greater detail below, the housing 124 helps to pre-rotate incoming air before it enters the vessel 132, reducing the velocity difference between the incoming air and air already inside the vessel 132, helping to ensure entrainment of the incoming air within the internal airflow inside the vessel 132 and thus creating good contact between the airflow and the charge of particulate desiccant material.

The housing inlet 128 can be oriented in accordance with the exact configuration in which the water harvesting unit 130 is to be arranged, taking into account the direction of incoming air. The plane defined by the housing inlet 128 can therefore be aligned with a radius of the vessel 132 but can also be aligned tangentially to the vessel 132.

The housing 124 may further comprise inlet vanes 146 arranged substantially around the entire outer surface of the sidewall 136. As discussed below, the inlet vanes 146 control the direction of air entering the vessel 132 through the sidewall 136. This assists with entrainment of the airflow within the existing internal airflow inside the vessel 132, helping to ensure good contact between the airflow and the charge of particulate desiccant material. However, the inlet vanes 146 are not essential.

In use, the water harvesting unit 130 operates in a very similar manner to the individual water harvesting units 30 of the water harvesting apparatus 10 described above, although the path of the incoming and outgoing airflows differs as a result of the different configuration. In use, the central axis A of the vessel 132 is located in the horizontal plane. The vessel 132 is rotated about its central axis A, with the centrifugal force generated by the rotation of the vessel 132 forcing the charge of particulate desiccant material located in the vessel 132 against the mesh lining of the sidewall 136.

In tests, a 300 g charge of aluminium fumarate particles with an average particle size of between 0.3 mm and 1 mm was loaded into a vessel 132 of approximately 160 mm in diameter. The water harvesting unit 130 was rotated at a speed of 235 rpm, causing a centrifugal force of approximately 5 G to act on the charge. In the adsorption mode of operation, an airflow rate of approximately 45 litres per second was passed through the water harvesting unit 130, which produced a sufficiently fluidised charge of aluminium fumarate. As with the water harvesting apparatus and units 10, 30 described above, the skilled person will understand that the combination of these parameters is highly dependent on the exact material used as the desiccant, the loading and the size of the particles thereof, as well as the geometry of the water harvesting unit 130 and the perforations in the sidewall 136 and that these parameters may therefore differ in practice.

Incoming air passes through the housing inlet 128 and enters the chamber 126. As the air travels around the chamber 126, it is eventually forced towards the inlet vanes 146 and sidewall 136 as the height h of the chamber 126 decreases.

By traveling around the chamber 126, the air is pre-rotated before entering the vessel 132. Even if the air does not travel a significant distance around the chamber 126, it is still pre-rotated to a degree by the action of the inlet vanes 146, which are aligned with the direction of rotation of the vessel 132 and the direction of the taper in the height h of the chamber 126. The incoming air therefore enters the first plenum space 138 of the vessel 132 through the inlet vanes 146 and the sidewall 136 in a predominantly radial direction: the sidewall 136 therefore acts as an inlet to the vessel 132.

In certain embodiments, the action of the housing 124 provides sufficient pre-rotation of the incoming airflow such that the inlet vanes 146 are unnecessary. In some cases the inlet vanes 146 may produce an additional pressure drop across the sidewall 136; this is detrimental to the operation of the system. In these circumstances it is desirable for the water harvesting unit 130 to not comprise the inlet vanes 146 and rely on the action of the housing 124 to pre-rotate the air. The inlet vanes 146 should therefore be regarded as an optional feature of the water harvesting unit 130.

Once inside the vessel 132, the air, having been pre-rotated by the action of the housing 124, comes into contact with the charge of particulate desiccant material and fluidises it. The conical shape of the filters 122 means that the charge of fluidised desiccant can extend along substantially the entire inner surface of the sidewall 136, maximising the space available for adsorption or desorption of water from the air. An internal airflow within the vessel 132 is created that follows the rotation of the vessel 132 and within which further incoming air is entrained upon entering the vessel 132. Entrainment of air within this internal airflow creates good contact between the airflow and the fluidised charge of desiccant material, allowing water in the air to be effectively adsorbed by the desiccant material. As discussed above, control of the pressure drop and distribution of air across the sidewall 136 and the mesh sidewall lining enables air to enter the vessel 132 without the creation of jets or plumes, thereby helping the incoming air to become effectively entrained within the internal airflow.

Eventually, the internal airflow carries the air out of the first plenum space 138 and into one of the second plenum spaces 152 at the ends of the vessel 132, passing across the respective filter 122 as it does so. The air is then exhausted out of the ends of the vessel 132, which act as vessel outlets 150. The adsorption mode of operation is continued until the charge of particulate desiccant material is saturated with adsorbed water, or until it is otherwise determined that the adsorption mode of operation should end.

To desorb the water adsorbed by the charge of particulate desiccant material, a similar method of operation is employed to the above-described method for adsorption of water, instead utilising a heated airflow to aid desorption of the water. The water is then condensed out of the desorption airflow and collected.

The individual water harvesting units 130 can be used as part of a water harvesting process system 60 as described above with reference to FIG. 6.

Figure 10:
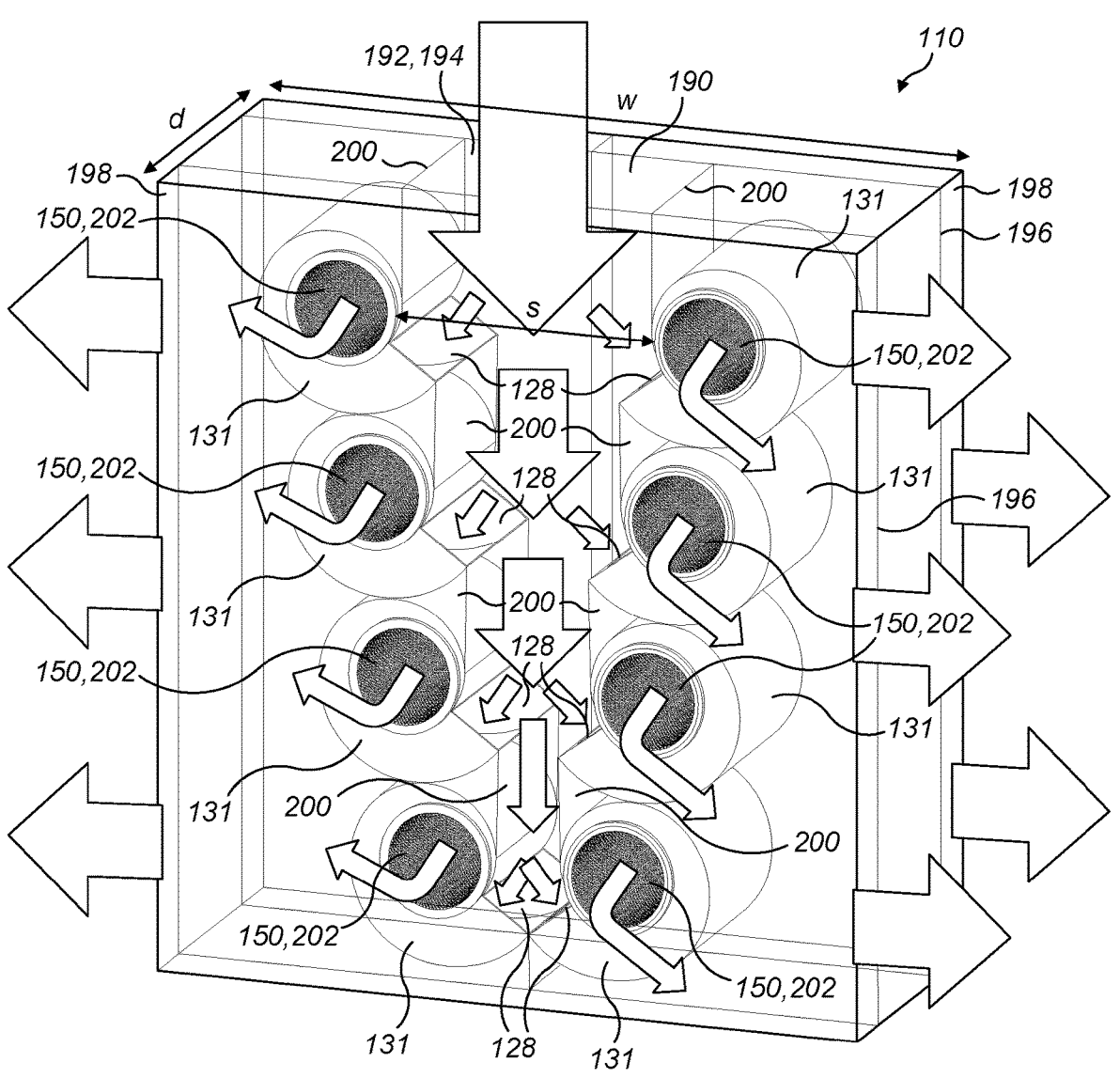
FIG. 10 shows a water harvesting apparatus.

Turning now to FIG. 10, which shows a water harvesting arrangement 110 comprising a cassette 190 which contains a plurality of water harvesting apparatuses 131 as described above with reference to FIGS. 8a, 8b, 9a and 9b. The cassette 190 has a width w that is greater than its depth d. The cassette 190 comprises a central inlet duct 192, with an opening 194 at a top end of the cassette 190, which is positioned centrally with respect to the width and depth directions of the cassette 190, but does not extend across the whole width w, or depth d, thereof. In the depth direction specifically, the extent of the inlet duct 192 is limited by the presence of two dividing walls 196 on respective sides thereof. The dividing walls 196 extend across the whole of the respective faces of the cassette 190 to define two cells 198 on each side of the cassette 190 in the direction of its depth.

The individual water harvesting apparatuses 131 are arranged in pairs within the cassette 190, with the central axes A of the water harvesting units 130 arranged space from, and parallel to, each other and normal to the width direction of the cassette 190 and the housings 124 of respective pairs of water harvesting apparatuses 131 being spaced apart from each other in the width direction, such that a spacing s, parallel to the width direction of the cassette, can be defined between the sidewalls 136 of both water harvesting apparatuses 131 in a pair. As can be seen in FIG. 10, the spacing s between respective pairs of water harvesting apparatuses 131 decreases as the distance between the pairs of water harvesting apparatuses 131 and the opening 194 of the inlet duct 192 increases. The water harvesting apparatuses 131 therefore can also be thought of as being arranged in two mutually-opposing stacks, each stack being arranged at a slight angle to the vertical.

The inlet duct 192 comprises a plurality of panels 200 to separate the duct 192 from other portions of the cassette 190. Each panel 200 runs vertically downwards and tangentially to the next water harvesting apparatus 131 in that stack. For panels 200 extending between two water harvesting apparatuses 131 in the same stack, the panel 200 extends vertically downwards from the terminus of the main wall 124a of the housing 124 of a first water harvesting apparatus 131 tangentially with the main wall 124a of the next water harvesting apparatus 131. Therefore, the only region of the water harvesting apparatuses 131 not covered by the panels 200 are the housing inlets 128 of the water harvesting apparatuses 131, which are consequently in fluid communication with the inlet duct 192. As a result of the decreased spacing s between water harvesting units 130 of successive pairs of water harvesting apparatuses 131, the inlet duct 192 gradually narrows as it moves away from the opening 194 and the top end of the cassette 190. This mitigates any decrease in the velocity of air as air travels down the cassette 190, as will be described further below.

The vessel outlets 150 (and consequently the second plenum spaces 152) of the water harvesting units 130 are arranged to be in fluid communication with the cells 198 on each side of the cassette 190 in the depth direction, via holes 202 in the dividing walls 196. The cells 198 therefore act as outlets for the cassette 190, enabling air exiting the water harvesting apparatuses 131 to leave the cassette 190.

In use, therefore, incoming air enters the cassette 190 of the water harvesting arrangement 110 through the opening 194 at the top end of the cassette 190 and travels down the inlet duct 192, eventually entering one of the housing inlets 128. From here, the individual water harvesting apparatuses 131 operate as described above, either adsorbing water from the incoming air onto the respective charges of particulate desiccant material or desorbing water from the desiccant into the airflow. The air then leaves the respective water harvesting units 130 via the second plenum spaces 152 and vessel outlets 150 and flows into the cells 198, whence it is exhausted out of the cassette 190.

Figure 11:
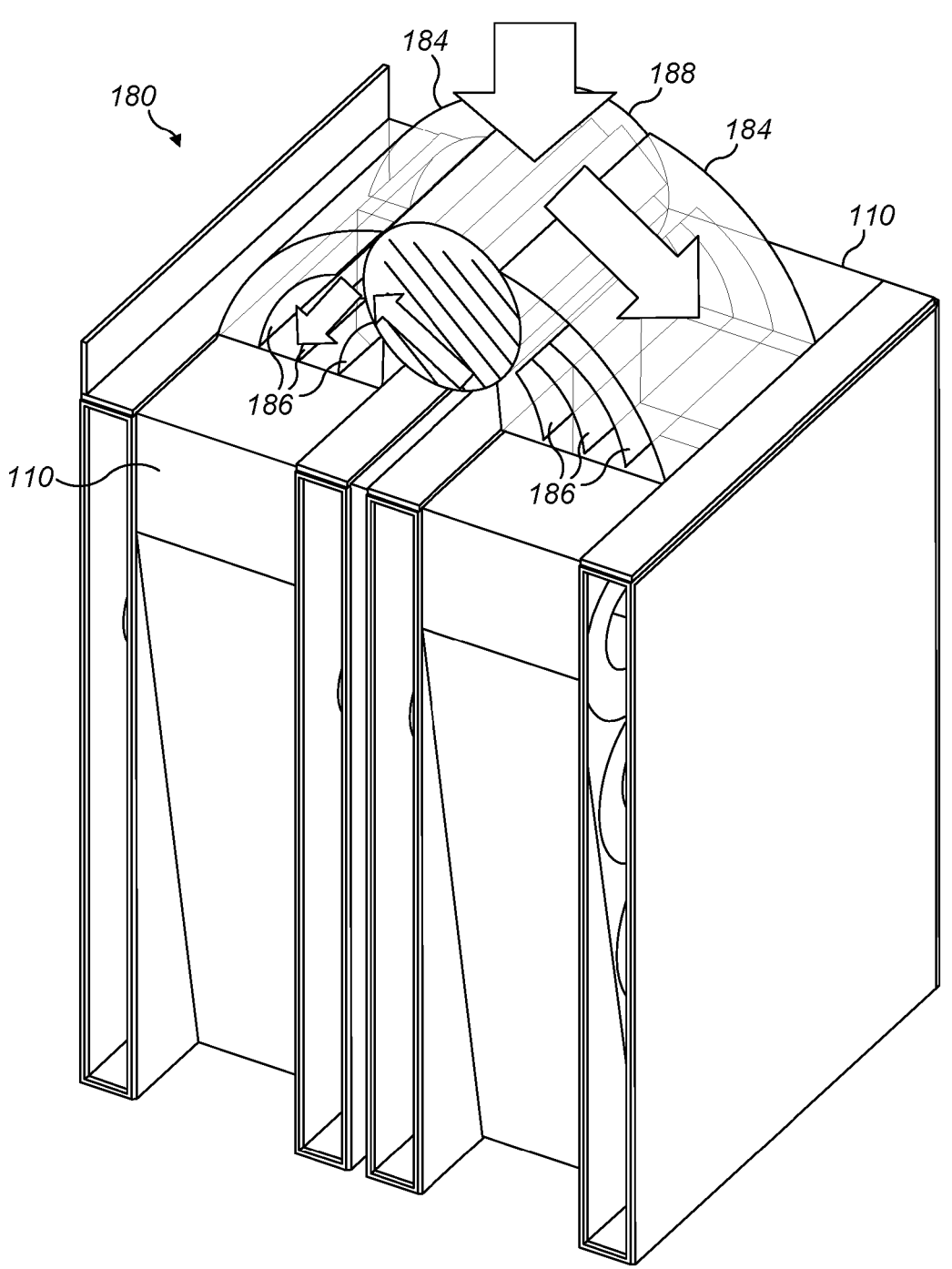
FIG. 11 shows a water harvesting arrangement.
Figure 12:
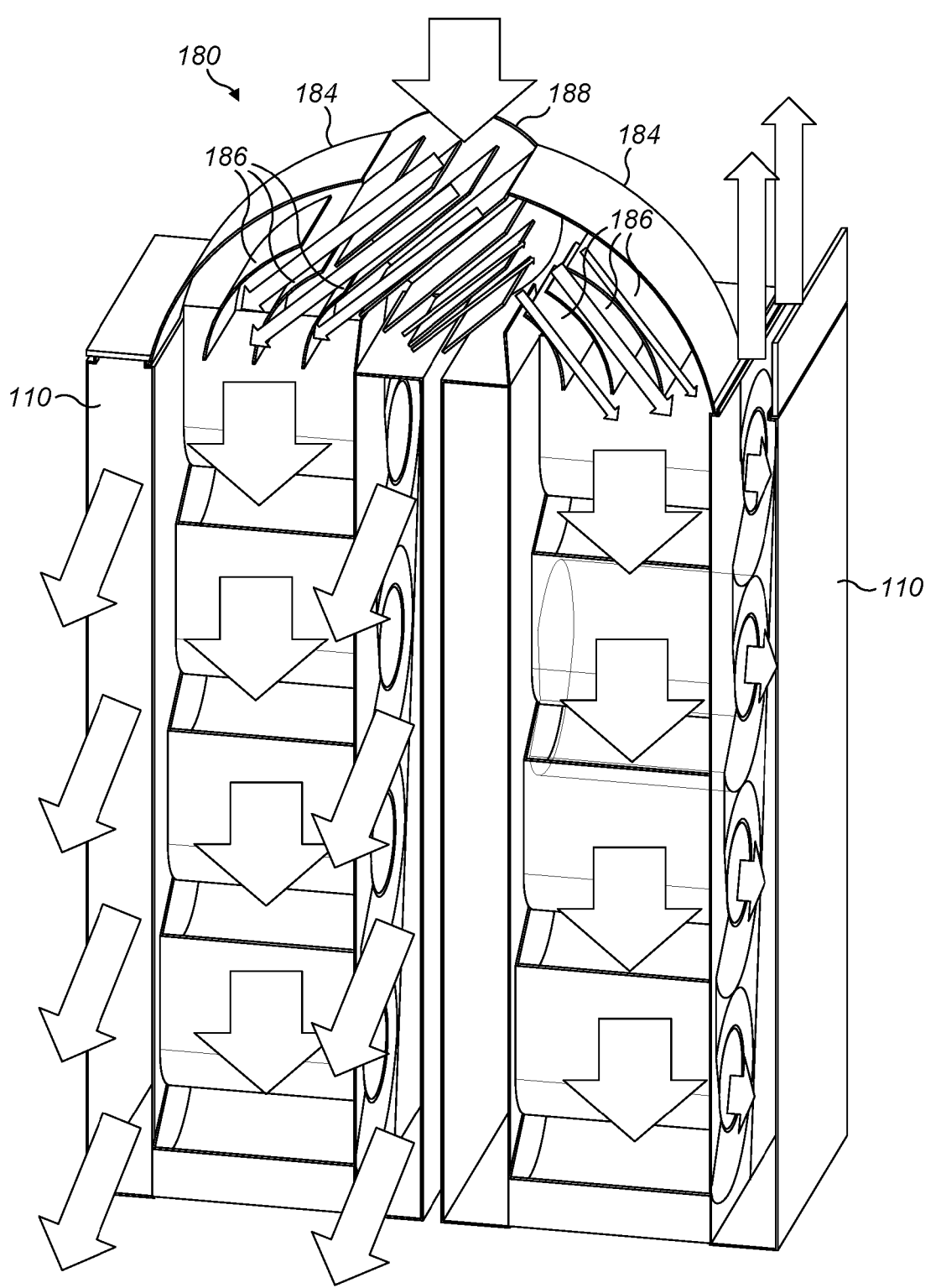
FIG. 12 shows a cross-sectional view of the water harvesting arrangement of FIG. 11.

The water harvesting arrangement 110, like the individual water harvesting apparatuses 131 of FIGS. 8a, 8b, 9a and 9b, can be used in a water harvesting process system 60 such as the one exemplified in FIG. 6. However, the water harvesting arrangement 110 can also be utilised within a water harvesting system 180 of the type shown in FIGS. 11 and 12. In FIGS. 11 and 12, a water harvesting system 180 is shown that comprises two water harvesting arrangements 110 as described above, the two water harvesting arrangements 110 being arranged such that their depth directions are co-linear with each other.

The water harvesting system 180 comprises a pair of inlet manifolds 184, each of which is in fluid communication at a bottom end thereof with the opening 194 of one of the inlet ducts 192 of the water harvesting arrangements 110. Each inlet manifold 184 comprises a plurality of guide vanes 186 to direct air cleanly through the respective manifold 184. A top end of each inlet manifold 184 is in fluid communication with a switching means, or airflow controller, 188. The airflow switching means 188 is configured to switch which inlet manifold 184 is in fluid communication with air supplied by an adsorption fan (not shown), which may be positioned centrally above the switching means 188, and which inlet manifold 184 is in fluid communication with air supplied by a desorption fan (also not shown), which may be located centrally beneath the switching means 188. In this way, the switching means 188 enables the respective water harvesting arrangements 110 to change between adsorption and desorption modes of operation and indeed defines which water harvesting arrangement 110 operates in which mode.

While FIGS. 11 and 12 show a water harvesting system 180 comprising only two water harvesting arrangements 110, this is not intended to be limiting and the water harvesting system 180 may comprise further water harvesting arrangements 110, each in communication with a switching means 188 via an inlet manifold 184, the switching means 188 being configured to control whether air is directed to the individual water harvesting arrangements 110 from the adsorption fan or desorption fan. The proportion of water harvesting arrangements 110 operating in an adsorption mode of operation to a desorption mode of operation may depend on the respective times taken for an adsorption or desorption cycle. For example, if an adsorption cycle takes twice as long as a desorption cycle and the water harvesting system 180 comprises three water harvesting arrangements 110, the switching means 188 may determine that two of the water harvesting arrangements 110 receive air from the adsorption fan and operates in an adsorption mode and the third water harvesting arrangement 110 receives air from the desorption fan and operates in a desorption mode.

Figure 13:
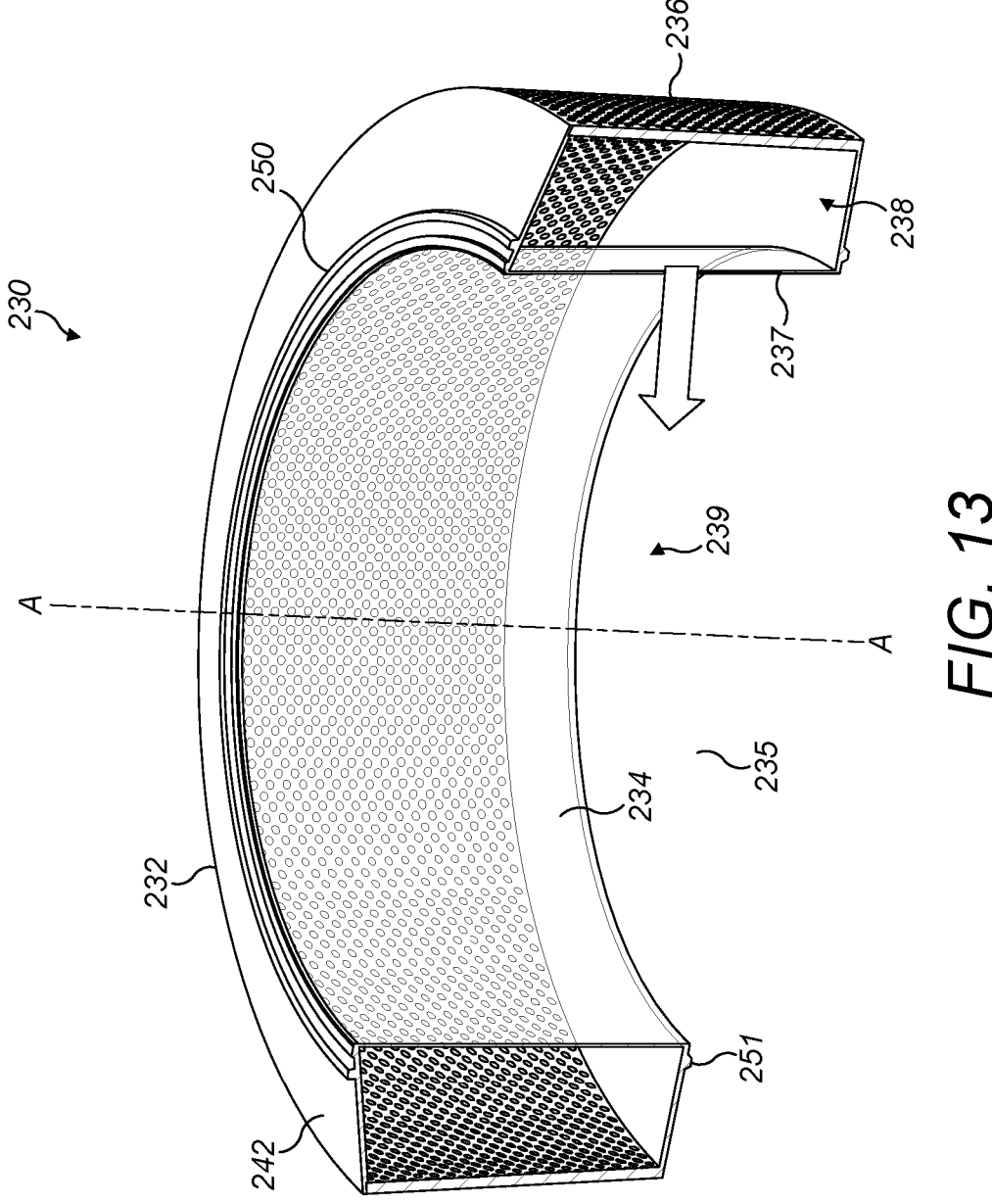
FIG. 13 shows a partial isometric view of an alternative water harvesting unit.

Turning now to FIG. 13, which shows another example of a water harvesting unit 230. The water harvesting unit 230 is rotationally symmetric about a central axis A and comprises a vessel 232. Like the water harvesting unit 30 of FIGS. 3 and 4, the central axis A of the water harvesting unit 230 is designed to be arranged substantially vertically in use. The vessel comprises an annulus shaped base 234, which defines an opening 235. A sidewall 236 rises from the outer circle of the base 234 and diverges away from the central axis A at a slight angle as it extends away from the base 234. An inner wall 237 rises vertically from the inner circle of the base 234 to a height at or near the height of the sidewall 236.

As described above with reference to the water harvesting unit 30, a result of the sidewall 236 diverging slightly away from the central axis A as it extends away from the base 234, is that the depth of the annular charge may be controlled so that it is substantially consistent over its height to help ensure a uniform pressure drop across the height of the annular charge in use. Nonetheless, in one example the sidewall 236 may be parallel to the central axis A.

A lip 242 extends between the top of the sidewall 236 and the top of the inner wall 237 to define an opening 244. The lip 242 may be arranged to be parallel with the base 234 or, as shown in the Figures, may extend upwardly, away from the base 234 at a slight angle to the horizontal such that the lip is frustoconical in shape. Consequently, in this embodiment the vertical height of the inner wall 237 is greater than the vertical height of the sidewall 236.

As described above with reference to the water harvesting unit 30, the lip 42 reduces the velocity of air moving inwards from the sidewall 236 towards the inner wall 237, thereby reducing entrainment of particles of desiccant material within the outgoing airflow and minimising elutriation of the desiccant material. The lip 242 is angled at about 10° to the base 234, but this angle may generally fall in the range between 0° and 15°. Angling the lip 242 serves to increase the radial and vertical cross-sectional flow area, leading to a further reduction in the velocity of air moving away from the sidewall 236, further minimising elutriation of the desiccant material.

The lip 242, sidewall 236, inner wall 237, and base 234 define a first plenum space 238 and second plenum space 239. A charge of particulate desiccant material (not shown) is received within the first plenum space 238. As is explained above, a preferred material for the charge of particulate desiccant material is a metal-organic framework (MOF) material such as aluminium fumarate. The inner wall 237 separates the first plenum space 238, containing the charge of desiccant material, from the second plenum space 239.

The inner wall 237 may comprises a mesh filter which allows air to pass through while preventing the charge of desiccant material from being expelled from the vessel 232 when the water harvesting unit 230 is in use. The size of the perforations in the mesh are determined by the size of the particles of desiccant material. The base 234, sidewall 236, and lip 242 each comprise a rigid plastics material such as acrylonitrile butadiene styrene (ABS) or polypropylene, for example.

The base 234 and the lip 242 are both fluid impermeable so that no air can pass through these portions of the vessel 232. The sidewall 236 comprises a plurality of holes such that the sidewall 236 is at least partially perforated or foraminous and fluids such as air can pass through. The holes in the sidewall 236 may be similar to the example given for the vessel 32 of FIGS. 1 to 12, or they may be any suitable size, depth and coverage as the skilled person would understand.

The side wall 236 may also comprise a mesh lining or covering (not shown) to help prevent the charge of particulate desiccant material falling out of the vessel 232 from the first plenum space 238. The mesh lining (if present) preferably has an average pore size that is smaller than the size of the desiccant particles. The sidewall lining may also help to even out the distribution of air entering the vessel 232, helping to provide good interaction between the airflow and the charge of desiccant material.

In use, one or more water harvesting units 230 are located within an outer housing 224. Together the water harvesting unit 230 and the outer housing 224 comprise a water harvesting apparatus 231.

Figure 14:
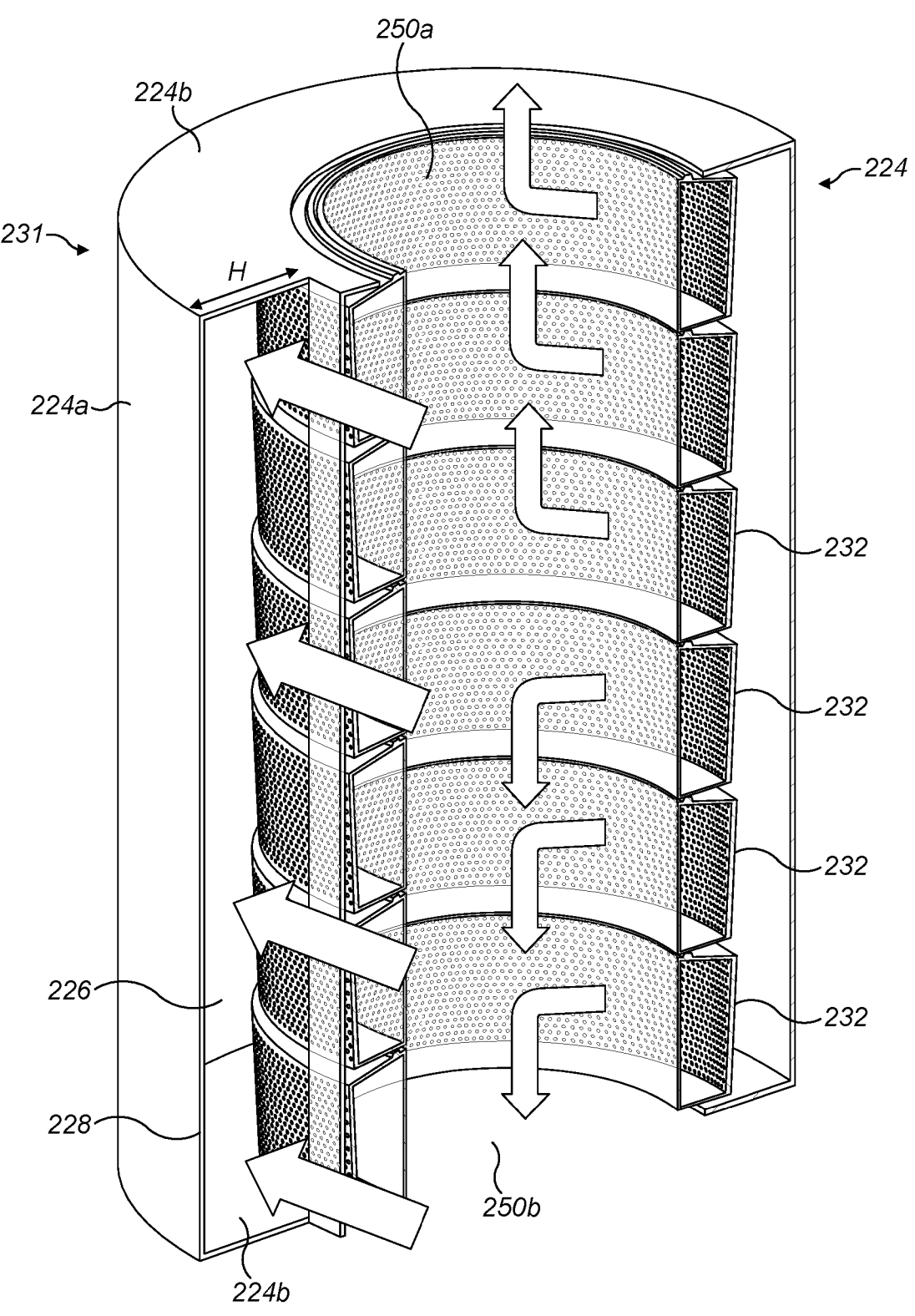
FIG. 14 shows a stack of the water harvesting units of FIG. 13 arranged in a housing.
Figure 15:
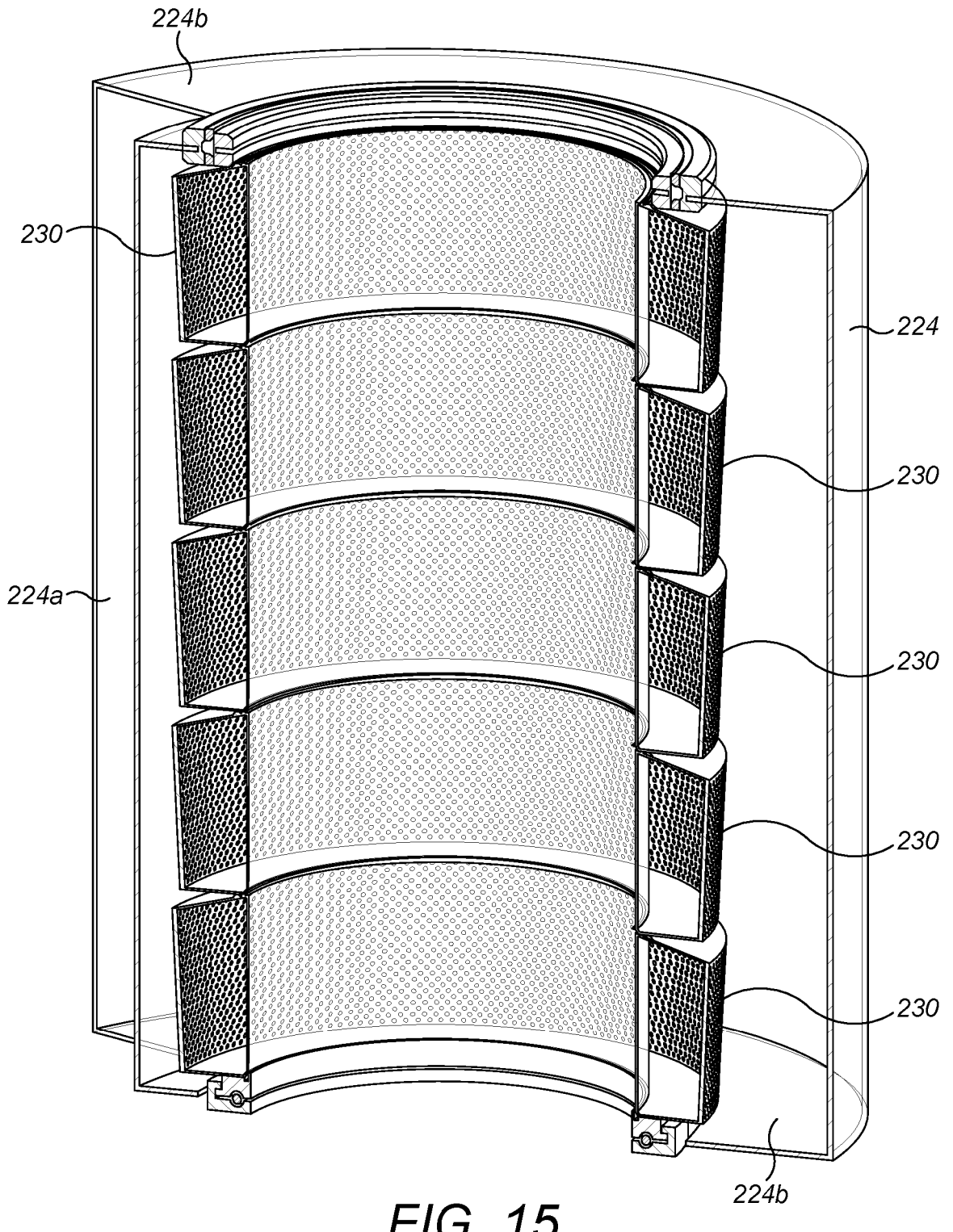
FIG. 15 shows the housing of FIG. 14.

As seen in FIGS. 14 and 15, the water harvesting apparatus 231 comprises a plurality of individual water harvesting units 230 which are arranged in a stack and contained within an outer housing 224. In an alternative example, the "stack" may comprise a plurality of water harvesting units 230 integrally formed as a single component. In a further alternative example, the water harvesting apparatus 231 may comprise a single water harvesting unit 230 contained within an outer housing 224. Alternatively, the water harvesting apparatus 231 may comprise a stack of water harvesting units 230 each contained within its own respective outer housing 224. The below description elaborates on the arrangement shown in FIGS. 14 and 15, however the skilled person would understand that this is also applicable to the other combinations of water harvesting units 230 and outer housings 224.

In the example shown, the water harvesting units 230 are arranged in a stack such that they share a common axis A. To form a stack of water harvesting units 230, the lip 242 of a first water harvesting unit 230 may be arranged to contact the base 234 of a second water harvesting unit 230. The lip 242 and base 234 may each be provided with a formation 250, 251 configured to engage with a complementary formation on the adjacent water harvesting unit 230. In the example shown in FIG. 13, the lip 242 comprises an annular channel formation 250 while the base 234 comprises an annular boss formation 251 which is configured to be received within the channel 250 of an adjacent water harvesting unit 230. The skilled person will understand that this is an example only and that arrangement of annular channel 250 and boss 251 may be reversed such that the channel 250 is on the base 234 and the boss 251 is on the lip 242. The skilled person will also understand that other continuous or non-continuous inter-engaging formations may be used to locate the water harvesting units 230 in the stack. It will be understood that the inter-engaging formations are not essential and that and suitable method of locating the water harvesting units 230 in a stack ay be used.

The outer housing 224 is similar to that shown in FIGS. 9a and 9b. However, the outer housing 224 of FIG. 14 is designed such that when it is in use with one or more water harvesting units 230, the central axis A is arranged substantially vertically. As such, the housing 224 is substantially volute in form and extends around substantially the whole outer surface of the plurality of sidewalls 236. The outer housing 224 comprises a main wall 224a, spaced apart from the plurality of sidewalls 236 in a radial direction, and two end walls 224b arranged at each end of the stack of vessels 232. The housing 224 and plurality of sidewalls 236 together therefore define a chamber 226 having a height H corresponding to the radial separation between the main wall 224a of the housing 224 and the plurality of sidewalls 236 of the stack of vessels 232.

Each of the end walls 224b and the main wall 224a of the housing 224 have a respective terminus, allowing the housing 224 to define a housing inlet 228 where the chamber 226 is in fluid communication with the environment external to the stack of water harvesting units 230. As can be seen in FIG. 14, the height H of the chamber 226 is at, or near, a maximum at the housing inlet 228 and gradually tapers as the main wall 224a extends around the plurality of sidewalls

236 of the stack of vessels 232, eventually reaching a minimum (not shown) when the main wall 224a has fully encircled the plurality of vessels 232. This minimum height may be zero, to avoid blocking of the housing inlet 228.

As with the housing 124 of FIGS. 9a and 9b, the housing 224 of FIG. 14 helps to pre-rotate incoming air before it enters the plurality of vessels 232, reducing the velocity difference between the incoming air and air already inside the plurality of vessels 232, helping to ensure entrainment of the incoming air within the internal airflow inside the plurality of vessels 232 and thus creating good contact between the airflow and the charges of particulate desiccant material.

The housing inlet 228 can be oriented in accordance with the exact configuration in which the plurality of vessels 232 is to be arranged, taking into account the direction of incoming air. The plane defined by the housing inlet 228 can therefore be aligned with a radius of the stack of vessels 232 but can also be aligned tangentially to the stack of vessels 232.

The housing 224 may further comprise inlet vanes (not shown) arranged substantially around the entire outer surface of the plurality of sidewalls 236. As discussed above with reference to the housing 124 of FIGS. 9a and 9b, the inlet vanes control the direction of air entering the plurality of vessels 232 through the plurality of sidewalls 236. This assists with entrainment of the airflow within the existing internal airflow inside the plurality of vessels 232, helping to ensure good contact between the airflow and the charge of particulate desiccant material. However, the inlet vanes are not essential and are therefore not represented in FIG. 14 or discussed further. The skilled person would be aware that if inlet vanes were incorporated into the housing 224, they would behave in the manner of the inlet vanes of the housing 124 of FIGS. 9a and 9b.

In use, the water harvesting unit 230 operates in a similar manner to the individual water harvesting units 30 of the water harvesting apparatus 10 described above. In use, the central axis A of the plurality of vessels 232 is located in the vertical plane. The plurality of vessels 232 are rotated about its central axis A, with the centrifugal force generated by the rotation of the plurality of vessels 232 forcing the plurality of charges of particulate desiccant material located in the plurality of vessels 232 against the mesh lining of the plurality of sidewalls 236.

Incoming air passes through the housing inlet 228 and enters the chamber 226. As the air travels around the chamber 226, it is eventually forced towards the inlet vanes if they are present, and the plurality of sidewalls 236 as the height H of the chamber 226 decreases.

By traveling around the chamber 226, the air is pre-rotated before entering the plurality of vessels 232. The incoming air therefore enters the first plenum space 238 of each vessel 232 of the plurality of vessels 232 through the sidewall 236 of each vessel 232 in a predominantly radial direction: each sidewall 236 therefore acts as an inlet to its corresponding vessel 232.

Once inside each vessel 232 of the plurality of vessels 232, the air, having been pre-rotated by the action of the housing 224, comes into contact with the charge of particulate desiccant material within each first plenum space 238 and fluidises it. The skilled person will understand that aluminium fumarate may be used as the particulate desiccant material such as is described above with respect to FIGS. 1 to 7b, but that parameters may differ in practice, such as type, amount and size of the particles, as well as the geometry of the water harvesting units 230 and the perforations in the sidewalls 236.

Contact between the incoming air and the fluidised annular charge of particulate desiccant material allows the water in the inlet air to be adsorbed by the desiccant material. After the air passes through each inner wall 237 into each second plenum space 239, it eventually leaves the water harvesting units 230 via either the top or bottom outlets 250a, 250b of the stack of vessels 232.

In use, the water harvesting apparatus 231 forms part of a water harvesting process system 60, such as is described above with reference to FIG. 6.

A plurality of water harvesting apparatuses 231 may be arranged in a water harvesting arrangement such as the water harvesting arrangement 110 shown in FIG. 10, or a water harvesting system such as the water harvesting system 110 shown in FIGS. 11 and 12, but, in each case, with the axes of rotation being arranged vertically rather than horizontally.

The invention claimed is:

1. A water harvesting apparatus, comprising:
   a plurality of water harvesting units each including a cylindrical vessel having a central axis, the vessel including:
      an at least partially fluid-permeable first cylindrical sidewall defining a vessel inlet;
      an at least partially fluid-permeable second cylindrical sidewall defining a vessel outlet;
      a fluid impermeable annular base, the annular base including a first locating formation disposed on an external surface of the annular base;
      a fluid impermeable annular lip, the annular lip including a second locating formation disposed on an external surface of the annular lip; and
      a charge of desiccant material configured to adsorb water;
   an outer housing having a volute configuration, the outer housing including:
      an air inlet channel in fluid communication with the vessel inlet of each water harvesting unit of the plurality of water harvesting units, the air inlet channel having a volute configuration; and
      an air outlet in fluid communication with the vessel outlet of each water harvesting unit of the plurality of water harvesting units;
   wherein the first cylindrical sidewall and the second cylindrical side wall extend between the annular base and the annular lip to define a plenum space;
   wherein the second cylindrical side wall is disposed at least partially within the first cylindrical sidewall;
   wherein the first cylindrical sidewall includes a mesh lining and/or covering;
   wherein the first locating formation is configured to inter-engage with the second locating formation of an adjacent water harvesting unit;
   wherein the plurality of water harvesting units are disposed in the outer housing, arranged for rotation within the outer housing, and orientated such that the central axis of each of the plurality of water harvesting units is vertical; and
   wherein the plurality of water harvesting units are configured to be rotated with respect to the outer housing about a common central axis.

2. The water harvesting apparatus of claim 1, wherein the first cylindrical sidewall diverges away from the annular base such that the vessel is substantially frustoconical.

3. The water harvesting apparatus of claim 1, wherein the annular lip is angled with respect to the annular base.

4. The water harvesting apparatus of claim 1, wherein at least a subset of the plurality of water harvesting units are formed as an integral unit.

5. The water harvesting apparatus of claim 1, wherein the air inlet channel is configured such that a widest end of the air inlet channel receives airflow in use.

6. A method of harvesting water from atmospheric air, comprising:

passing a flow of atmospheric air through at least one water harvesting apparatus according to claim 1;

stopping the flow of atmospheric air through at least one of the plurality of water harvesting units;

passing a flow of desorption air through at least one of the plurality of water harvesting units; and cooling the flow of desorption air exiting at least one of the plurality of water harvesting units to recover liquid water from the flow of desorption air.

7. The method of harvesting water from atmospheric air as claimed in claim 6, wherein cooling the flow of desorption air includes a first cooling step followed by a second further cooling step.

8. The method of harvesting water from atmospheric air as claimed in claim 7, further comprising:

compressing the flow of desorption air before the second further cooling step; and expanding the flow of desorption air after the second further cooling step.

9. The method of harvesting water from atmospheric air as claimed in claim 8, further comprising removing water from the flow of desorption air prior to compressing the flow of desorption air.

10. The method of harvesting water from atmospheric air as claimed in claim 9, wherein removing water from the flow of desorption air includes:

passing the flow of desorption air through a separator; and collecting the water removed from the flow of desorption air.

11. The method of harvesting water from atmospheric air as claimed in claim 7, wherein the first cooling step includes passing the flow of desorption air through a first heat exchanger.

12. The method of harvesting water from atmospheric air as claimed in claim 11, wherein the second further cooling step includes passing the flow of desorption air through a second heat exchanger.

\* \* \* \* \*